(12) United States Patent
Qin et al.

(10) Patent No.: US 11,403,529 B2
(45) Date of Patent: Aug. 2, 2022

(54) NOISE INJECTION TRAINING FOR MEMORY-BASED LEARNING

(71) Applicant: Western Digital Technologies, Inc., San Jose, CA (US)

(72) Inventors: Minghai Qin, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 712 days.

(21) Appl. No.: 16/022,116

(22) Filed: Jun. 28, 2018

(65) Prior Publication Data
US 2019/0311267 A1 Oct. 10, 2019

Related U.S. Application Data

(60) Provisional application No. 62/664,487, filed on Apr. 30, 2018, provisional application No. 62/653,020, filed on Apr. 5, 2018.

(51) Int. Cl.
*G06N 3/08* (2006.01)

(52) U.S. Cl.
CPC .................. *G06N 3/084* (2013.01)

(58) Field of Classification Search
CPC ........ G06N 3/084; G06N 3/08; G06N 3/0445; G06N 3/0454; G06N 3/0635; G06N 3/04; G06N 3/06; G06N 3/063; G06K 9/6277; G06K 9/0061; G06K 9/2018; G06K 9/00617; G06K 9/4628; G06K 9/00604; G06K 9/4609; G06K 9/4671;

(Continued)

(56) References Cited

U.S. PATENT DOCUMENTS 9,646,243 B1 * 5/2017 Gokmen .............. G06N 3/0454
9,779,355 B1 * 10/2017 Leobandung .......... G06N 3/084
(Continued)

OTHER PUBLICATIONS

Cassidy, et al., "Cognitive Computing Building Block: A Versatile and Efficient Digital Neuron Model for Neurosynaptic Cores", Cognitive Computing group at IBM Research; 2013, 10 pages.
(Continued)

*Primary Examiner* — Mouloucoulaye Inoussa
(74) *Attorney, Agent, or Firm* — Vierra Magen Marcus LLP

(57) ABSTRACT

The system described herein can include neural networks with noise-injection layers. The noise-injection layers can enable the neural networks to be trained such that the neural networks are able to maintain their classification and prediction performance in the presence of noisy data signals. Once trained, the parameters from the neural networks with noise-injection layers can be used in the neural networks of systems that include resistive random-access memory (ReRAM), memristors, or phase change memory (PCM), which use analog signals that can introduce noise into the system. The use of ReRAM, memristors, or PCM can enable large-scale parallelism that improves the speed and computational efficiency of neural network training and classification. Using the parameters from the neural networks trained with noise-injection layers, enables the neural networks to make robust predictions and calculations in the presence of noisy data.

20 Claims, 17 Drawing Sheets

(58) Field of Classification Search
CPC .. G06F 11/076; G06F 11/079; G06F 11/0721; G06F 12/0246; G06F 12/0833; G06F 12/0215; G06F 13/1689; G06F 12/127; G06F 11/073; G06F 17/18; G06F 11/0793; H03K 19/20; G16H 50/30; G16H 10/60; G16H 30/20; G11C 16/0441; A61B 6/5217; A61B 6/032; A61B 6/50; H04L 63/0245; H04L 63/1425

See application file for complete search history.

(56) References Cited

U.S. PATENT DOCUMENTS

| | | | | |
|---|---|---|---|---|
| 10,970,441 | B1* | 4/2021 | Zhang | G06F 30/33 |
| 2003/0191728 | A1* | 10/2003 | Kulkarni | G06N 3/086 706/21 |
| 2017/0011290 | A1* | 1/2017 | Taha | G06N 3/0635 |
| 2017/0228646 | A1* | 8/2017 | O'Connor | G06N 3/084 |
| 2018/0150715 | A1* | 5/2018 | Chang | G06K 9/4609 |
| 2018/0300618 | A1* | 10/2018 | Obradovic | H01L 27/11556 |
| 2019/0122105 | A1* | 4/2019 | Boybat Kara | G06N 3/063 |
| 2019/0124045 | A1* | 4/2019 | Zong | G06N 3/0454 |
| 2019/0131016 | A1* | 5/2019 | Cohen | G16H 70/60 |
| 2019/0180174 | A1* | 6/2019 | Koswatta | G06N 3/08 |
| 2020/0004357 | A1* | 1/2020 | Harada | G09G 3/3225 |

OTHER PUBLICATIONS

Hu, et al., "Dot-Product Engine for Neuromorphic Computing: Programming 1T1M Crossbar to Accelarate Matrix-Vector Multiplication", Hewlett Packard Laboratories; Dept. of Electrical and Computer Engineering; Jun. 5-9, 2016, Austin, Texas; USA. Retrieved from the Internet: http://dx.doi.org/10.1145/2897937.2898010; 6 pages.

Hu, et al., "Hardware realization of BSB recall function using memristor crossbar arrays"; ResearchGate Article, Jun. 2012; Retrieved from the internet: https://researchgate.net/publication/254005313; DOI 10.1145/2228360.0008448, 7 pages.

Li, et al., "A Memristor Crossbar-Based Computation Scheme with High Precision", arXiv:1611.03264v2 [cs.ET] Nov. 19, 2016, 6 pages.

Pastur-Romay, et al., "Deep Artificial Neural Networks and Neuromorphic Chips for Big Data Analysis: Pharmaceutical and Bioinformatics Applications", International Journal of Molecular Sciences 2016, 17, 1313; doi:10.3390/ijms17081313; www.mdpi.com/journal/ijms; 26 pages.

* cited by examiner

NOISE INJECTION TRAINING FOR MEMORY-BASED LEARNING

CROSS-REFERENCE TO RELATED APPLICATIONS

This application claims priority to U.S. Provisional Patent Application No. 62/653,020 filed on Apr. 5, 2018, and U.S. Provisional Patent Application No. 62/664,487 filed on Apr. 30, 2018, both of which are herein incorporated by reference in their entirety.

BACKGROUND OF THE DISCLOSURE

Neural networks are modeled as collections of connected neurons where the outputs of neurons in one layer serve as the inputs to the neurons in another layer. The neurons in one layer can be fully connected to the neurons in another layer. For example, each neuron in a first layer can have a pairwise connection to each of the neurons in a second layer.

SUMMARY OF THE DISCLOSURE

Neural networks have several hidden layers between an input and an output layer. Data is forward-passed from the input layer to the output layer via the hidden layers. The input data is classified based on the activation values of the neurons in the output layer. For example, the input data is classified into the class that corresponds to the output neuron with the highest activation value. The training of neural networks is performed on pristine data. However, in practice, noise in the signal can arise from storage and memory media errors or from the programming noise of in-memory computation where analog signals can be used to represent real values. The classification by the neural networks can be highly susceptible to the introduction of noise, and the accuracy of the neural network can decrease as noise in introduced into the system.

According to at least one aspect of the disclosure, a method can include generating a neural network. The neural network can include a first hidden layer. The first hidden layer can include a first plurality of neurons. The neural network can include a second hidden layer that can include a second plurality of neurons. The neural network can include a noise-injection layer. The noise-injection layer can include a plurality of noise neurons that are positioned between the first hidden layer and the second hidden layer. Each of the plurality of noise neurons can be coupled with a respective one of the first plurality of neurons with a first link and at least a portion of the second plurality of neurons with a plurality of links. Each of the noise neurons can add a noise component to a signal passed between the respective one of the first plurality of neurons and the at least the portion of the second plurality of neurons. The method can include determining a weight for each of the plurality of links. The method can include setting the weight for each of the plurality of links into a resistive network of an analog processor. The method can include transmitting an input signal to each of a plurality of inputs to the analog processor. The method can include receiving an output signal from each of the plurality of outputs of the analog processor. The output signal can be based on at least the input signal to each of the plurality of inputs of the analog processor and the plurality of weights. The method can include determining a classification based on the output signal.

In some implementations, the method can include setting the weight for each of the plurality of links as a conductivity of a respective plurality of memory cells in the resistive network. The plurality of memory cells can include at least one of a resistive random-access memory (ReRAM), memristors, or phase change memory (PCM). The input signal can include a vector of voltages and a respective element from the vector of voltages is transmitted to each of the plurality of inputs. The method can include determining the weight for each of the plurality of links with back-propagation. The output signal can include an output signal representing the matrix multiplication of the plurality of weights and the input signal. The method can include adding a second noise-injection layer comprising a second plurality of noise neurons after each matrix multiplication in the neural network.

In some implementations, the noise component is one of Gaussian noise, Brownian noise, Poisson noise, Speckle noise, or Salt and Pepper noise. The method can include determining a plurality of biases for the neural network. The neural network can be a recurrent neural network, a convolutional neural network, or a long-short-memory neural network.

According to at least one aspect of the disclosure, a method can include retrieving, from a storage medium by a digital processor, a plurality of weights. The plurality of weights can be determined using a neural network including a first hidden layer and a second hidden layer. The first hidden layer and the second hidden layer can be coupled through a noise-injection layer configured to add noise to a signal passing between the first hidden layer to the second hidden layer. The method can include setting, by the digital processor, the plurality of weights into an analog-based circuitry. The method can include transmitting, by the digital processor, at least a portion of an input signal into each of a plurality of inputs of the analog-based circuitry. The method can include receiving, by the digital processor, an output signal from each of the plurality of outputs of the analog-based circuitry. The output signal based on the input signal to each of the plurality of inputs of the analog-based circuitry and the plurality of weights. The method can include determining a classification of the input signal based on the output from each of the plurality of outputs of the analog-based circuitry.

In some implementations, the method can include loading the plurality of weights into the resistive network by setting a conductivity of each of respective plurality memory cells in the resistive network. The plurality of memory cells can include at least one of a ReRAM, memristors, or PCM. The output signal can include an output current representing a matrix multiplication of the plurality of weights and the input signal.

According to at least one aspect of the disclosure, a system can include a memory storing a plurality of weights. Each of the plurality of weights can indicate a connection strength between neurons in a neural network. The neural network can include at least one noise injection layer between a first layer of the first neural network and a second layer of the neural network. The system can include an analog processor. The analog processor can include a resistive network. The resistive network can include a plurality of memory cells, a plurality of inputs, and a plurality of outputs. The system can include a digital processor to load each of the plurality of weights into a respective one of the plurality of memory cells. The digital processor can transmit at least a portion of an input signal to each of the plurality of inputs of the analog processor. The digital processor can receive an output signal from each of the plurality of outputs of the analog processor. The output signal can be based on the at least the portion of the input signal to each of the plurality of inputs of the analog processor and the plurality of weights. The digital processor can determine a classification based on the output signal.

In some implementations, the resistive network of the analog processor can include a plurality of memory cells. The plurality of memory cells can include at least one of a ReRAM, memristors, or a PCM. The plurality of weights is loaded into the respective one of the plurality of memory cells by setting the conductance of the respective one of the plurality of memory cells.

According to at least one aspect of the disclosure, a system can include a digital processor to retrieve, from a storage medium, a plurality of weights, the plurality of weights determined from a neural network comprising a first hidden layer and a second hidden layer, wherein the first hidden layer and the second hidden layer are coupled through a noise-injection layer configured to add noise to a signal passing from the first hidden layer to the second hidden layer. The digital processor can load each of the plurality of weights into an analog-based circuitry. The digital processor can transmit at least a portion of an input signal to each of a plurality of inputs of the analog-based circuitry. The digital processor can receive an output signal from each of a plurality of outputs of the analog-based circuitry. The output signal can be based on the at least the portion of the input signal to each of the plurality of inputs of the analog-based circuitry and the plurality of weights. The digital processor can determine a classification based on the output signal.

In some implementations, the analog-based circuitry comprises a resistive network, the resistive network comprising a plurality of memory cells, the plurality of inputs, and the plurality of outputs. In some implementations, the plurality of memory cells comprises at least one of resistive random-access memory (ReRAM), memristors, or phase change memory (PCM).

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
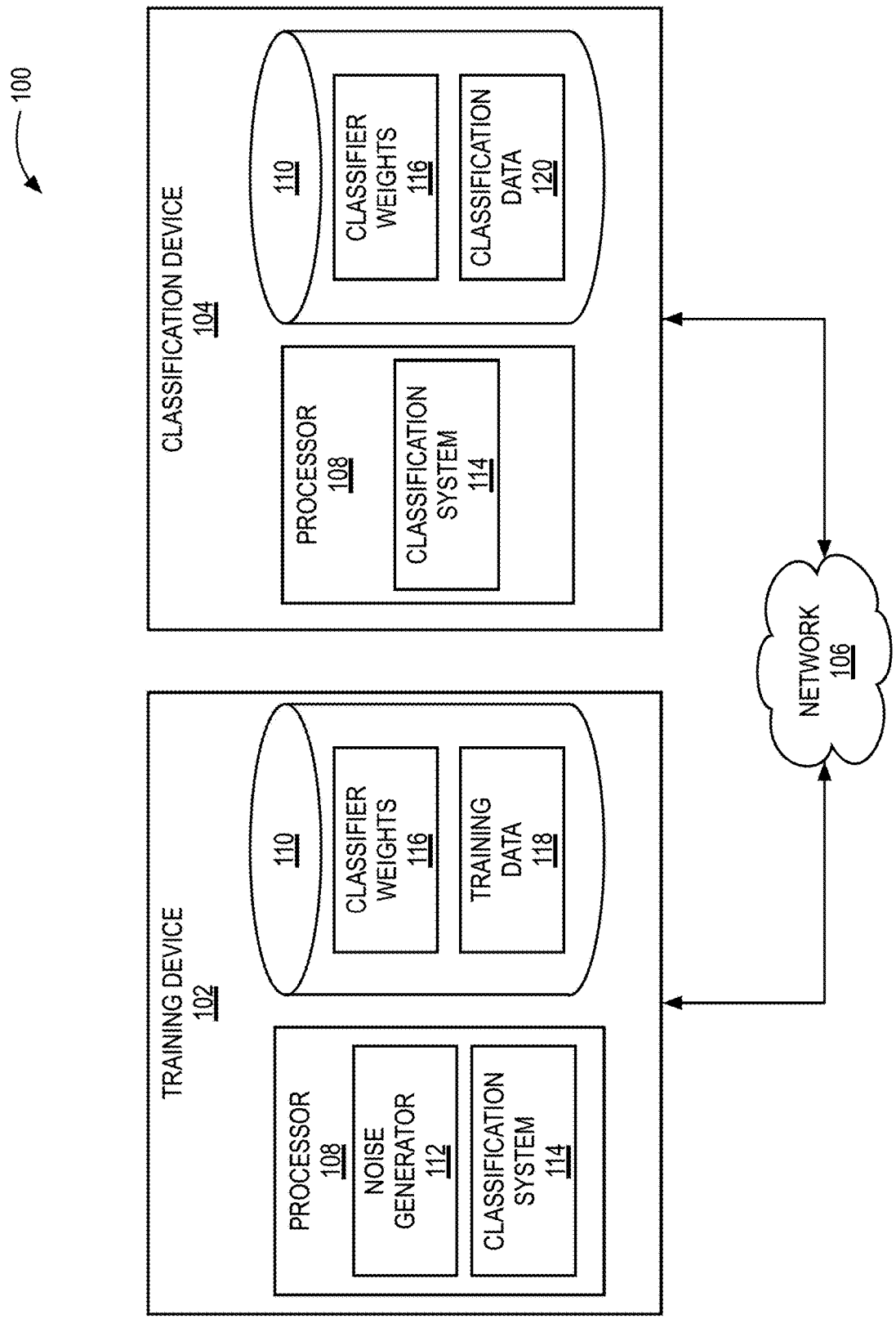
FIG. 1A illustrates a block diagram of an example training and classification system, in accordance with some embodiments of the present disclosure.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Neural networks can have several hidden layers between an input and an output layer. Data is forward-passed from the input layer to the output layer via the hidden layers. It is possible that the intermediate results between layers can become distorted from storage and memory media errors or calculations performed by analog-based circuitry (as opposed to the digital signals of a graphical processing unit (GPU)). If the neural network is trained in the absence of noise, the performance of the neural network can be deteriorated when making predictions or classifications in the presence of noise. The solution described herein includes training neural networks that include additional noise-injection layers. The neural network parameters learned using the neural networks with noise-injection layers can be used in neural networks that are used in systems that may include analog-based circuitry or other sources of noise to increase the robustness of the neural network during prediction and classification.

FIG. 1A illustrates a block diagram of an example training and classification system 100. The system 100 can include a training device 102 and a classification device 104. The training device 102 and the classification device 104 can communicate with one another via a network 106. The training device 102 can include at least one processor 108 and a memory element 110. The processor 108 can include or execute a noise generator 112 and a classification system 114. The memory element 110 can store a plurality of classifier weights 116 and training data 118. The training device 102 and the classification device 104 can communicate directly via the network 106. In some implementations, the network 106 may include a LAN network, a Wi-Fi network, a cellular network, a wide area network (WAN), a telephone network, such as the Public Switched Telephone Network (PSTN), a wireless link, a satellite link, a device-to-device mesh network, an intranet, the Internet, or combinations thereof.

The training device's processor 108 can be configured to provide information processing capabilities at the training device 102. The processor 108 can include one or more of digital processors, analog processors, digital circuits designed to process information, analog circuit designed to process information, a state machine, and/or other mechanisms for electronically processing information. Although the processor 108 is illustrated as a single entity, the training device 102 (and classification device 104) can include a plurality of processors 108. Each processor 108 can include a plurality of processing units. The processor 108 can be electrically coupled with the memory element 110 and can be configured to execute the noise generator 112 and the classification system 114.

The training device's noise generator 112 and classification system 114 are described further below. As an overview, the noise generator 112 can be any script, file, program, application, set of instructions, or computer-executable code that is configured to enable a computing device on which the noise generator 112 is executed to generate and introduce noise into the signals processed by the classification system 114. For example, as described below, the noise generator 112 can configure the noise neurons of the neural network's noise-injection layers. The classification system 114 can be any script, file, program, application, set of instructions, or computer-executable code that is configured to enable a computing device on which the classification system 114 is executed to train the system's neural network and classify data.

The classification system 114 can include one or more machine learning algorithms configured to extract features from data and classify the data based on the extracted features. The classification system 114 can include an artificial neural network. The neural network can include an input layer, a plurality of hidden layers, a plurality of noise-injection layers, and an output layer. The neural network can be a multilayered neural network, a convolutional neural network, a recurrent neural network, or a long-short-term-memory neural network.

The noise generator 112 can generate noise signals and introduce the noise signals into the classification system's neural network via the noise neurons of the noise-injection layers. For example, processor executable instructions representing the noise neurons can add noise signals to signals through the noise neurons. The noise signals can distort or modify the input and/or outputs of the neurons in the classification system's neural network. For example, the noise generator 112 can distort a neuron's output by adding a random, normalized value to the output of the neuron. The noise generator 112 can configure the noise neurons to inject Gaussian noise, Brownian noise, Poisson noise, Speckle noise, or Salt and Pepper noise to the signals they receive.

Figure 1B:
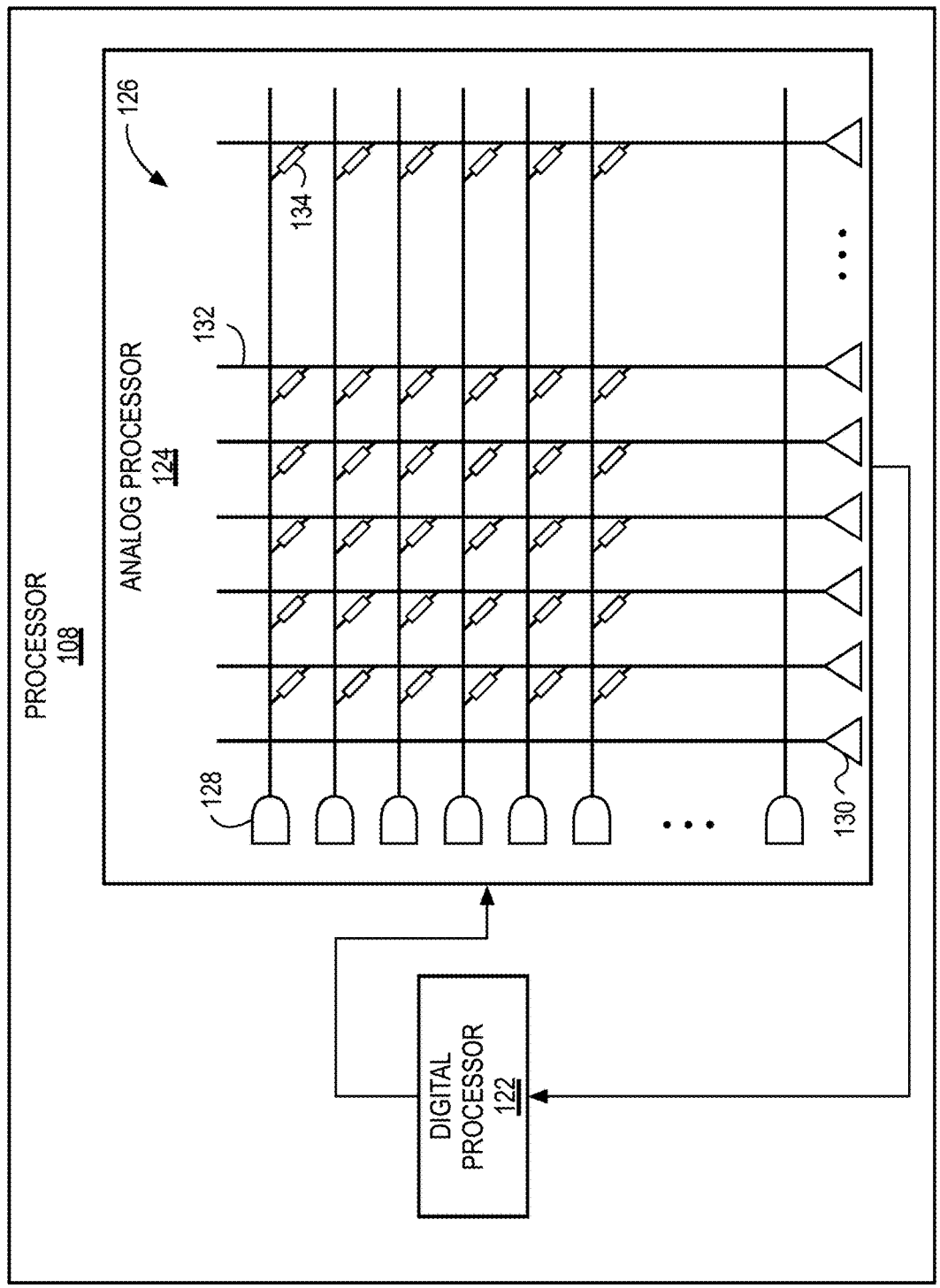
FIG. 1B illustrates a block diagram of an example processor for use in the system illustrated in FIG. 1A, in accordance with some embodiments of the present disclosure.

During a training phase, the classification system 114 can generate the weights and biases that are later used by the classification device's classification system 114 to classify data. The classification system 114 can generate the weights and biases using only a digital processor (e.g., without using an analog processor as discussed in relation to FIG. 1B). The training data 118 can be data that is similar to the classification data 120. For example, both the training data 118 and the classification data 120 can include images, video files, audio files, or other data files. The files in the training data 118 can also include a class label. For example, an image of a bird in the training data 118 can include the label "bird" and an image of a car in the training data 118 can include the label "car."

The classification system 114 can generate the weights and biases by inputting the training data 118 into the neural network and comparing the resulting classification to the expected classification (as defined by the input data's label). For example, in an example system that includes 10 output neurons that each correspond to a different classification, the classification system 114 can use back-propagation and gradient descent to minimize the cost or error between the expected result and result determined by the classification system 114. Once the classification system 114 has trained its neural network, the classification system 114 can save the weights and biases to the memory element 110 as classifier weights 116.

The system 100 can include a classification device 104. The classification device 104 can include at least one processor 108 that can execute or include an instance of the classification system 114. The classification device 104 can include a memory element 110, which can store classification data 120 and an instance of the classifier weight 116 as determined by the training device 102 during a training phase. In some implementations, the training device 102 and the classification device 104 can be the same device. For example, a single device can include (or have access) to both the training data 118 and the classification data 120, and once trained on the training data 118, the device can classify the classification data 120. In some implementations, the training device 102 and the classification device 104 can be different devices.

The processor 108 can include a digital processor 122 and/or an analog processor 124. For example, the processor 108 of the training device 102 can include only a digital processor 122, and the processor 108 of the classification device 104 can include both a digital processor 122 and an analog processor 124. The digital processor 122 and the analog processor 124 can be a single component. For example, the digital processor 122 and the analog processor 124 can both be components of a single microchip. In some implementations, the digital processor 122 and the analog processor 124 can be separate components. For example, the digital processor 122 and the analog processor 124 can be housed within different microchips of the classification device 104 that are in electrical communication with one another. The digital processor 122 can include a plurality of transistors for performing calculations and executing processor executable instructions. The digital processor 122 can include one or more microprocessors, application-specific integrated circuits (ASIC), field-programmable gate arrays (FPGA), or combinations thereof. The analog processor 124 can include one or more resistive networks 126. The resistive network 126 can include a plurality of inputs 128 and a plurality of outputs 130. Each of the plurality of inputs 128 and each of the plurality of outputs 130 can be coupled with nanowires 132. The nanowires 132 of the inputs 128 can be coupled with the nanowires of the nanowires 132 of the outputs 130 via memory elements 134. The memory elements 134 can include ReRAM, memristors, or PCM. The processor 108, via the analog processor 124, of the classification device 104 can use analog signals to perform matrix-vector multiplication. The digital processor 122 can set the conductance of the memory cells 134 to represent each of the respective values in the matrix. For example, the memory cell 134 in a (1,1) location of the analog processor 124 can be set to represent a value in the matrix at location (1,1). Analog processor 124 may comprise analog-based circuitry in some implementations.

Once the memory elements 134 are configured, the matrix-vector multiplication can be performed by the analog processor 124 by applying an input signal to each of the inputs 128. The input signal can be a vector of signals or values. The value of each element in the input signal can be represented by a voltage level. The input signal applied to each of the inputs 128 can be a portion of an input signal. For example, for an image that is provided to the inputs 128, the digital processor 122 can provide an input signal with a voltage proportional to a value of a respective pixel of the image to each of the inputs 128. The product of the matrix-vector multiplication can be measured as the output (in Amps or Volts) at each of the outputs 130. The digital processor 122 can convert each of the output 130 into an output vector. For example, the digital processor 122 can include an analog to digital converter that can convert the voltage measure at each output 130 into a digital value. In some implementations, the digital processor 122 can convert the digital value into final value for the output vector. For example, the voltage value measured at each of the outputs 130 can be proportional to the value that the digital processor 122 saves as elements in the output vector.

The analog processor 124 can naturally introduce noise into the signals that pass through the circuitry of the analog processor 124. By using the weights, biases, and other parameters from the training device 102 whose neural network included noise-injection layers, the classification device 104 can be less sensitive to the noise introduced into the analog signals as the analog signals pass through the analog processor 124, which can enable the processor 108 to continue to make accurate classifications of noisy data signals.

Figure 2:
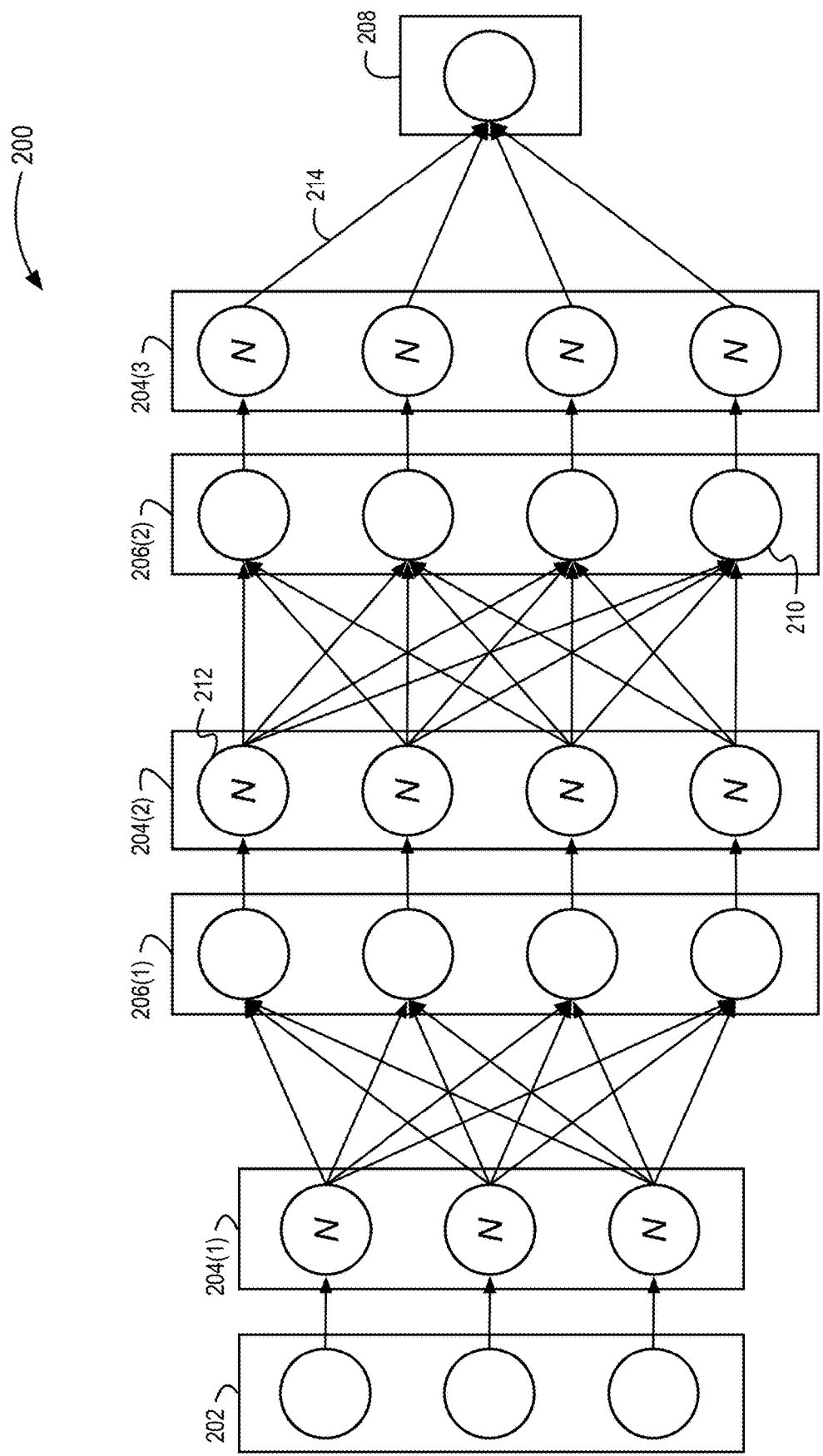
FIG. 2 illustrates an example neural network of the classification system illustrated in FIG. 1A during a training phase, in accordance with some embodiments of the present disclosure.

FIG. 2 illustrates an example neural network 200 that can be used in the classification system 114 of the system 100 during a training phase. The neural network 200 is for illustrative purposes. The neural network of the classification system 114 can include any number of layers with each layer including any number of neurons. The neural network 200 illustrated in FIG. 2 includes an input layer 202 and an output layer 208. Between the input layer 202 and the output layer 208, the neural network 200 includes noise-injection layer 204(1), noise-injection layer 204(2), and noise-injection layer 204(3), which can collectively be referred to as noise-injection layers 204. The neural network 200 also includes hidden layer 206(1) and hidden layer 206(2), which can collectively be referred to as hidden layers 206. Each of the input layer 202, hidden layers 206, and output layer 208 can include a plurality of neurons 210. The noise-injection layers 204 can include a plurality of noise neurons 212. The neurons (e.g., the neurons 210 and the noise neurons 212) can be coupled together with links 214.

The output of the input layer 202 and hidden layers 206 pass to a respective neuron 212 in a noise-injection layer 204. In some implementations, each neuron 210 in the input layer 202 and hidden layers 206 can be connected to a noise neuron 212 in a noise-injection layer 204. In some implementations, only a portion of the neurons 210 in the input layer 202 and the hidden layers 206 can be connected to a noise neuron 212 or a noise-injection layer 204. In some implementations, each of the input layer 202 and hidden layers 206 can provide their respective outputs to a noise-injection layer 204. In other implementations, only some of the input layers 202 and the hidden layers 206 provide their respective outputs to a noise-injection layer 204. For example, a first hidden layer 206 provides its output to a first noise-injection layer 204, but a second hidden layer 206 may not provide its output to a second noise-injection layer 204.

Each of the noise neurons 212 can be configured by the noise generator 112. The noise neurons 212 can add noise to the input they receive to generate a noisy signal or modified signal, which the noise neurons 212 can then input into the neurons 210 to which they are connected. The noise generator 112 can configure each of the noise neurons 212 to add Gaussian noise, Brownian noise, Poisson noise, Speckle noise, or Salt and Pepper noise to the signals they receive. Each of the noise neurons 212 can add the same type of noise or different types of noise. The classification system 114 can also configure the relative magnitude of the added noise with respect to the input signal. Each of the noise neurons 212 can have the same relative magnitude or can have different magnitudes.

Each neuron 210 outputs the total of a weighted sum of its inputs plus a bias. The output of each neuron 210 can pass through an activation function such as a sigmoid function, rectified linear unit (ReLu), or a leaky ReLu. The weight for each input into a neuron 210 is defined by the weight of the link 214 that provides the input. As described above, during the training phase, the weights of each of the links 214 and the bias for each neuron 210 is determined. The weight of the input links 214 to each noise neuron 212 can be set to 1 and the weights of the links 214 from the noise neuron 212 to the neurons 210 can be set during the training phase.

Figure 3:
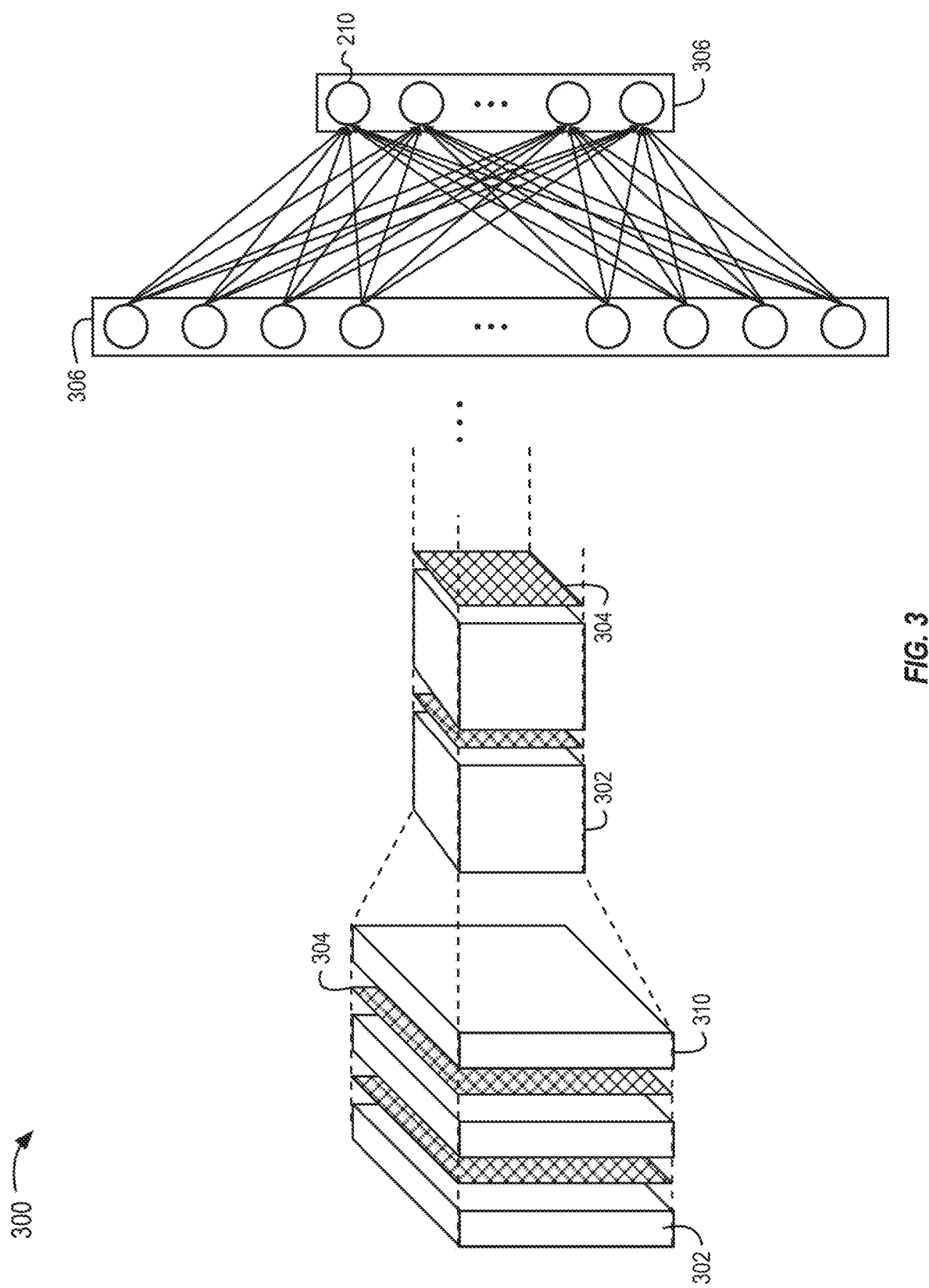
FIG. 3 illustrates an example convolutional neural network of the classification system illustrated in FIG. 1A during a training phase, in accordance with some embodiments of the present disclosure.

FIG. 3 illustrates an example convolutional neural network 300 that can be used during the training of the classification system 114. The convolutional neural network 300 can include a plurality of convolution layers 302, a plurality of noise-injection layers 304, a plurality of pooling layers 310, and a plurality of fully connected layers 306. The noise-injection layers 304 can include a plurality of noise neurons 212 and the other layers can include a plurality of neurons 210. The convolutional neural network 300 is for illustrative purposes and can include any number of the above layers each with any number of neurons 210 and noise neurons 212.

Each of the layers of the convolutional neural network 300 can have a volume defined by neurons (neurons 210 or noise neurons 212) arranged in a width, height, and depth dimension. Each of the layers of the convolutional neural network 300 can transform an input volume into an output volume.

The convolution layers 302 can include a plurality of neurons 210. Rather than being fully connected (e.g., connected to teach neuron 210 in the preceding layer) as with the neurons 210 in the neural network 200, the neurons 210 in the convolutional neural network 300 can be locally connected to different regions in the preceding layer. The depth dimension of the convolution layers 302 can represent the output from convolving the input with different filters. Each depth layer of a convolution layer 302 can represent the output of convolving the input with a respective filter. The filters are spacial filters that can detect, for example, edges, orientations, colors, and other features of the input volume.

The pooling layers 310 can reduce the spacial size of the convolution layers 302. Reducing the spacial size of the convolutional neural network 300 can reduce the parameters of the convolutional neural network 300 which can reduce the computational requirements for running the convolutional neural network 300. The pooling layers 310 can reduce the spacial size by down sampling a received input volume. For example, the width and height of a convolution layer 302 can be reduced by half by applying a pooling layer 310 with a 2×2 filter that only saves the maximum value within the 2×2 filter as the filter is convolved over the input values.

The convolutional neural network 300 can include one or more fully connected layers 306. The fully connected layers 306 can serve as the output of the convolutional neural network 300 and can follow any number of pooling layers 310, convolution layers 302, or noise injecting layers 304. As with the neurons 210 of the neural network 200, the neurons 210 in the fully connected layers 306 can include an array of neurons 210 that are connected to each of the neurons 210 in the neighboring layers. The last fully connected layer 306 can serve as the output of the convolutional neural network 300 and can include a different neuron 210 for each classification class.

The noise-injection layers 304 can include noise neuron 212 that are configured similarly to the noise neuron 212 of the neural network 200. The convolutional neural network 300 can include a noise-injection layer 304 between each of the convolution layers 302 and/or the pooling layers 310. The noise neurons 212 in the noise-injection layers 304 can add a noise component to the input value that it receives, which can then be passed to a subsequent convolution layer 302, pooling layer 310, or fully connected layer 306.

Figure 4:
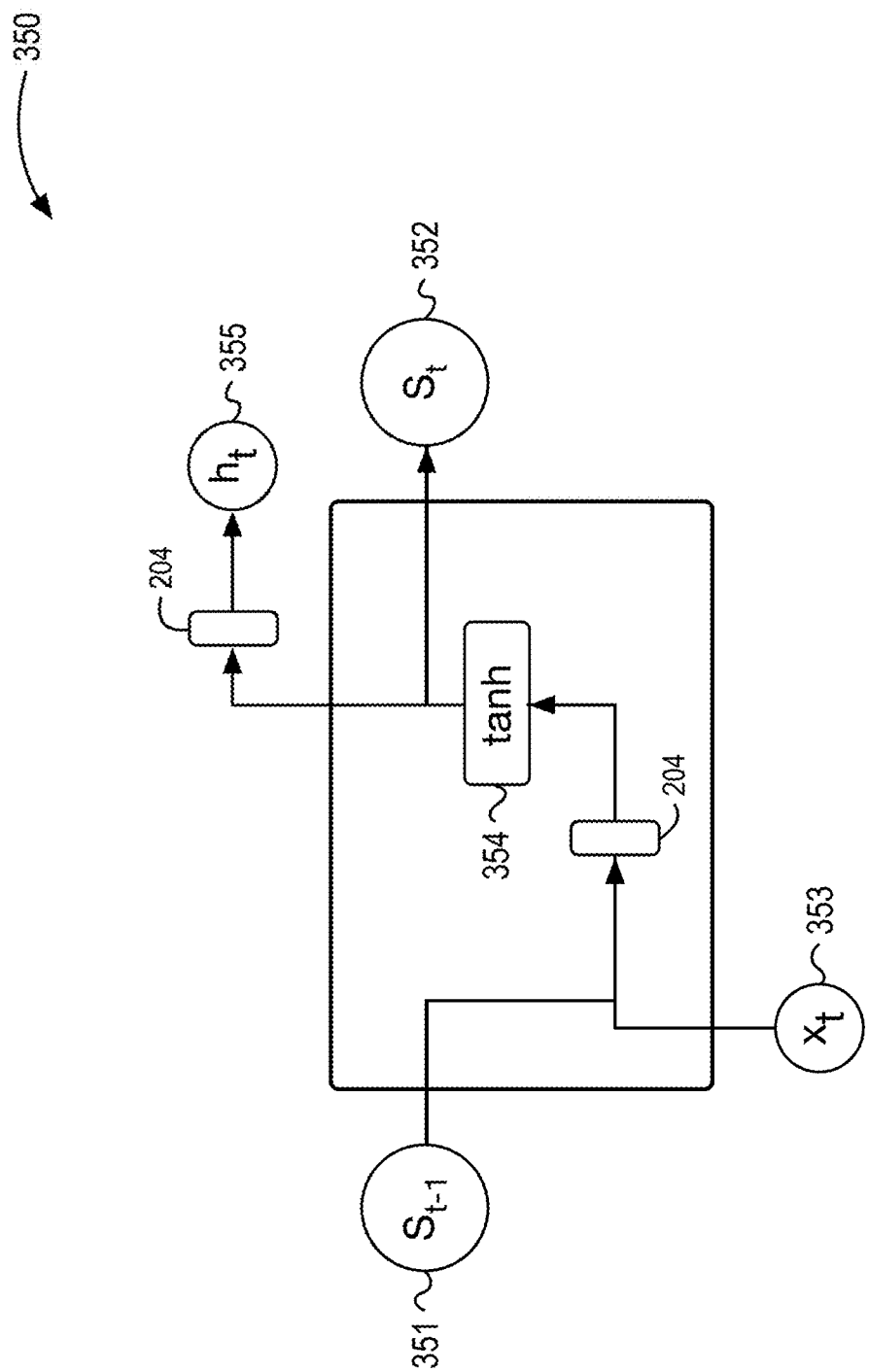
FIG. 4 illustrates an example unit in a recurrent neural network, in accordance with some embodiments of the present disclosure.

FIG. 4 illustrates an example unit 350 in a recurrent neural network (RNN) that can be used to generate weights and biases to be used by a classification device 104 to classify data. The RNN can include one or more noise injection layers. The RNN is a class of neural networks that has directed cycles that enable the RRN to create internal states and exhibit temporal behaviors. The RNN can be unfolded in time to form a feedforward neural network for training purposes. FIG. 4 illustrates one example unit 350 in an RNN at time t. The unit 350 at time t can receive a state from a unit 350 at time t−1 and provide a state to a unit 350 at time t+1. For example, a prior state 351 ($S_{t-1}$) from a previous unit 350 can be provided to the unit 350. The state 352 ($S_t$) from the current unit 350 can be provided to the next unit 350. The unit 350 can receive an input 353 as $x_t$. The unit 350 can include multiple noise injection layers 204. For example, the unit 350 can include a first noise injection layer 204 prior to the tan h layer 354 and a second noise injection layer 204 prior to the output 355. The unit 350 can include a noise injection layer 204 after each location in the unit 350 where a matrix-vector multiplication would occur during the calculations performed by the unit 350. For example, the unit 350 can include a noise injection layer 204 after the matrix multiplication of the input 353 with the prior state 351 ($S_{t-1}$) from a previous unit 350.

Figure 5:
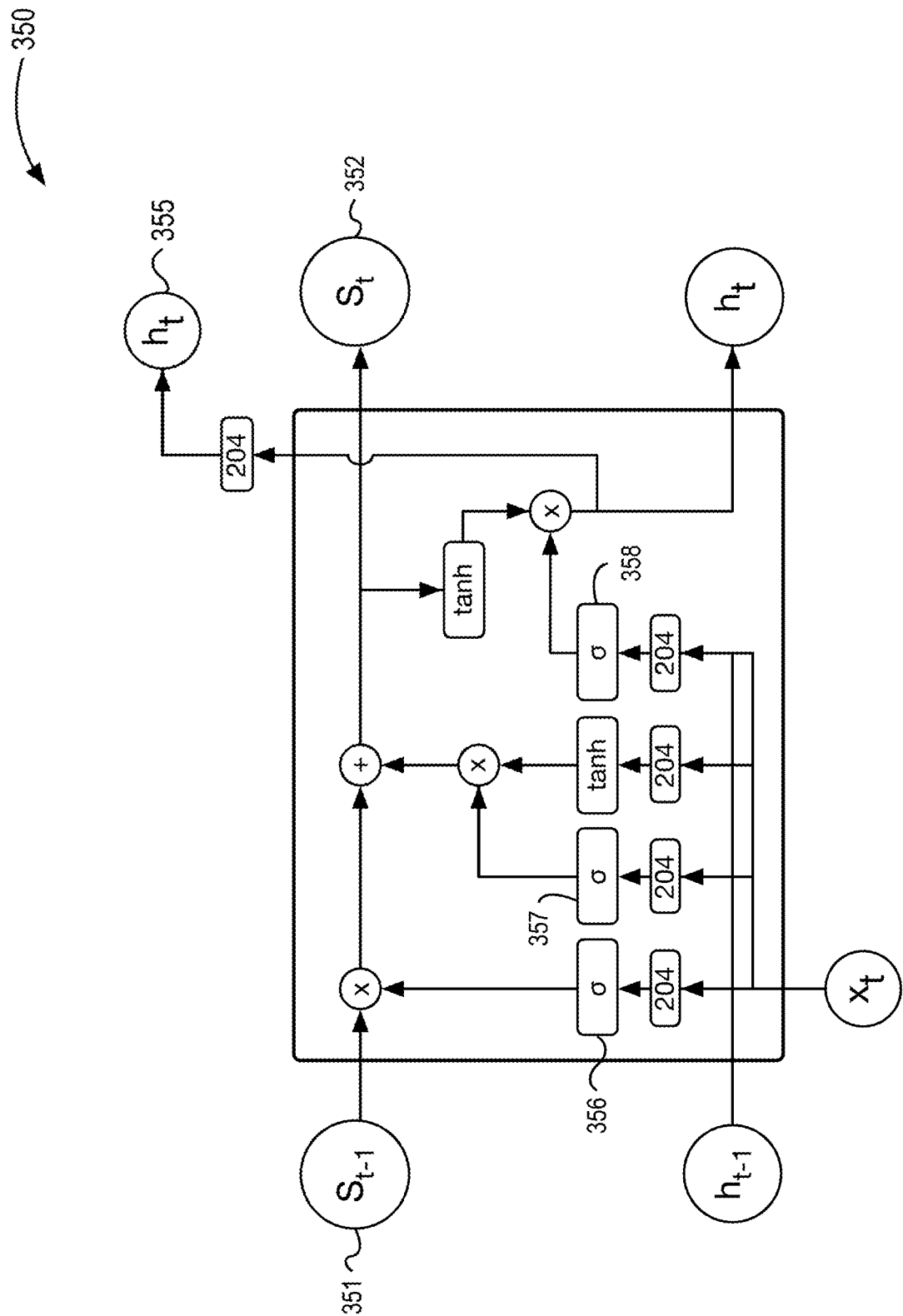
FIG. 5 illustrates an example unit configured as a long-short-term-memory unit, in accordance with some embodiments of the present disclosure.

FIG. 5 illustrates an example unit 350 configured as a long-short-term-memory (LSTM) unit that can be used to generate weights and biases to be used by a classification device 104 to classify data. The example unit 350 can include one or more noise injection layers. The LSTM unit 350 can store states for a longer period of time when compared to a unit of the RNN. The LSTM unit 350 can include a forget-gate layer 356 that can output a number between 0 and 1 for each incoming state value ($S_{t-1}$) to indicate whether the unit 350 should forget (e.g., the layer 356 outputs a 0), remember (e.g., the layer 356 outputs a 1), or some degree therebetween (e.g., when the layer 356 outputs a number between 0 and 1). The LSTM unit 350 can include an update gate 357 that can indicate how the unit's state should be updated based on the current input. The LSTM unit 350 can include an output gate 358 that can be used to determine what value $h_t$ the LSTM unit 350 should output. The LSTM unit 350 can include a noise injection layer 204 after each matrix multiplication. For example, the LSTM unit 350 can include a noise injection layer 204 after the matrix multiplication of the $x_t$ with the $h_{t-1}$ and prior to each of the gates 356-358.

Figure 6:
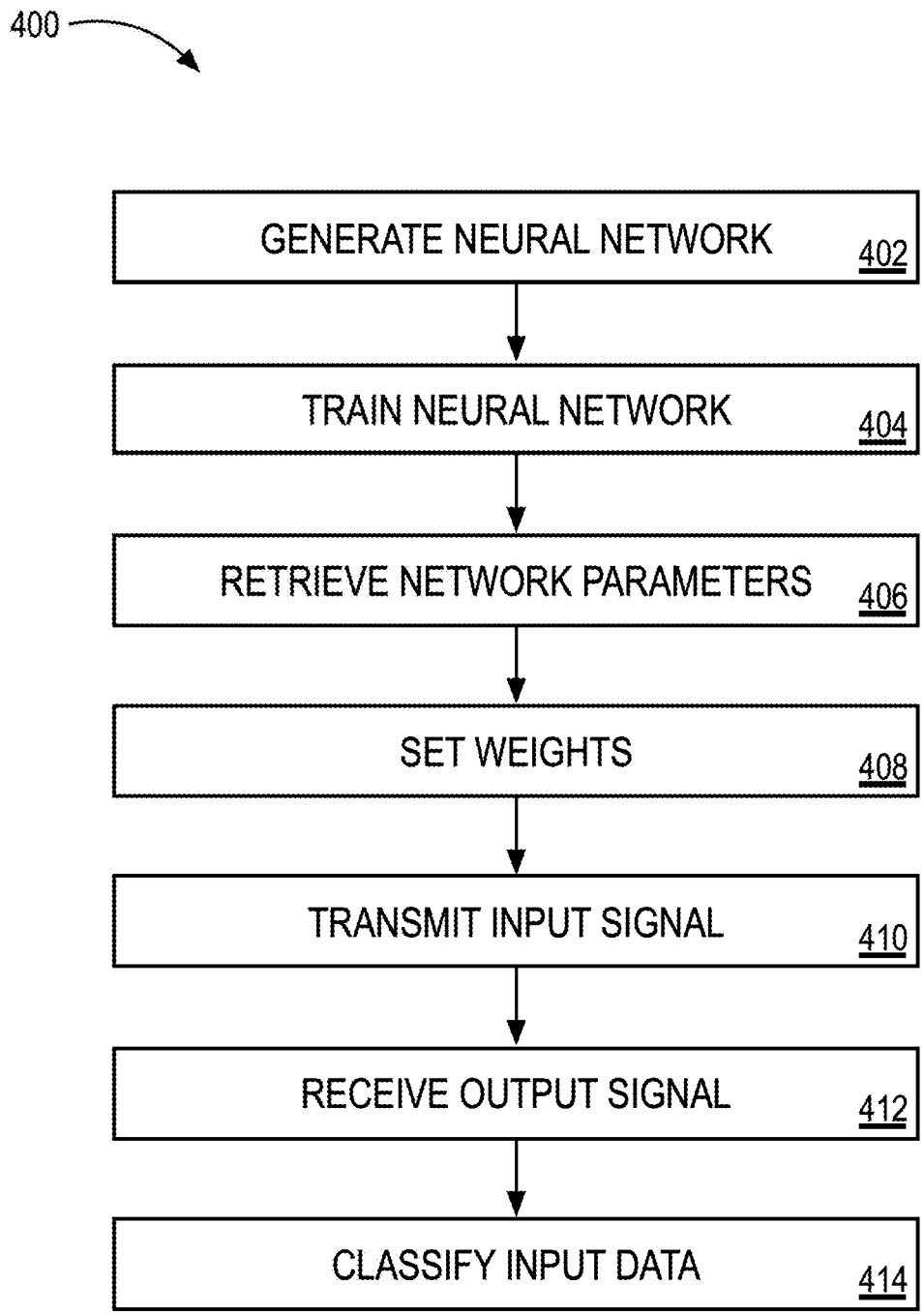
FIG. 6 illustrates a block diagram of an example method to classify data with the system illustrated in FIG. 1A, in accordance with some embodiments of the present disclosure.

FIG. 6 illustrates a block diagram of an example method 400 to classify data with the system 100, illustrated in FIG. 1A. The method 400 can include generating a neural network (step 402). The method 400 can include training the neural network (step 404). The method 400 can include retrieving the network parameters (step 406). The method 400 can include setting the weights (step 408). The method 400 can include transmitting an input signal (step 410). The method 400 can include receiving an output signal (step 412). The method 400 can include classifying input data (step 414).

As set forth above, the method 400 can include generating a neural network (step 402). Also, referring to FIGS. 1-5, the neural network can be a neural network or a class thereof, such as a convolutional neural network, an RNN, or a LSTM neural network. The type of neural network can be selected based on the type of data to be classified. For example, when classifying image data, the generated neural network can be a convolutional neural network and when classifying text or speech the neural network can be a LSTM neural network. The neural network can be generated to include a plurality of noise-injection layers. While illustrated herein as a network of neurons and other units, the neural network can be generated or represented as a plurality of calculations or processors executable instructions that can be calculated or executed by a processor of a computing device, such as training device 102, illustrated in FIG. 1A. The neural network can include a noise-injection layer after each location in the neural network where a matrix multiplication is calculated. The noise-injection layers can include noise neurons 212 (or processor executable code) that add noise (e.g., random values) to the inputs they receive before passing their output to neurons in a subsequent layer.

The method 400 can include training the neural network (step 404). The training device 102 can train the classification system's neural network. The neural network can include one or more noise-injection layers or neurons. During the training phase, the training device 102 can determine link weights, neuron biases, and filter configurations (collectively referred to as the network's parameters) for the neural network. The classification system 114 can be trained using training data 118. The training data 118 can include data that is already labeled into a classification class. To train the classification system 114, the training device 102 can initially configure the parameters randomly. The training device 102 can then input the training data 118 into the classification system's neural network and calculate an accuracy or cost between the neural network's returned output and the expected output (as defined by the training data's label). The training device 102 can use back-propagation and gradient descent to tune the parameters to minimize the cost or error between the expected results. Once tuned, the parameters can be saved to the memory element 110.

The method 400 can include retrieving the neural network parameters (step 406). Also referring to FIG. 1A, among others, the training device 102 can generate or calculate the network parameters. The training device 102 can store the network parameters in the memory element 110. In some implementations, the training device 102 can provide the tuned neural network parameters to a classification device 104. In some implementations, the classification device 104 can retrieve the network parameters from the training device 102. The classification device 104 can store the network parameters in its memory element 110. Prior to setting the weights of the neural network, the classification device 104 can retrieve or load the network parameters from the data repository of the training device 102 or the classification device 104.

The method 400 can include setting the weights (step 408). The method 400 can include setting the weights into a resistive network of a processor of the classification device 104. For example, in addition to a digital processor 122, the classification device 104 can also include an analog processor 124. The analog processor 124 can include a resistive network 126. The resistive network 126 can include a plurality of memory elements 134 that can include resistive random-access memory, memristors, or phase change memory. As an analog device, the analog processor 124 can introduce analog noise into signals but are passed through the analog processor 124. The digital processor 122 of the classification device 104 can set the weights by altering the conductivity of the memory elements 134.

The method 400 can include transmitting the input signal (step 410). The method 400 can include transmitting a portion of the input signal to each of the inputs 128 of the resistive network 126. For example, the input signal can be a vector of values calculated by the digital processor 122. The digital processor 122 can convert the vector of values into a vector of voltages, where each of the voltages in the vector of voltages is proportional to a corresponding value in the vector of values. Each voltage in the vector of voltages can be applied to one of the inputs 128. For example, the first element in the vector of voltages can be applied to the first input 128 and the $n^{th}$ element in the vector of voltages can be applied to the $n^{th}$ input 128.

The method 400 can include receiving an output signal (step 412). The method 400 can include receiving an output signal from each of the plurality of outputs of the resistive network 126. The output signal can be based on the input signal to each of the inputs 128 and the network parameters set at step 408. For example, the network parameters (e.g., weights) can be set as a conductance of each of the memory elements 134. A voltage applied to one of the inputs 128 is modified by the conductance of the analog processor 124 at the crossbar between the nanowire 132 connected to the input 128 and the given output 130 where the output voltage is sensed according to Ohm's law. Applying a vector of voltages at the inputs 128 generates, in parallel, a vector of output voltages at the outputs 130.

The method 400 can include classifying the input data (step 414). The classification device 104 can include a memory element 110 with classification data 120. The classification device 104 can input the classification data 120 into the classification device's classification system 114, which is configured with the parameters from the training device 102. The neural network, using the trained parameters, can output a classification class. For example, each neuron in the output layer of the neural network can correspond to a different classification class. Each of the neurons in the output layer can generate a different value responsive to the neural network receiving data to classify from the classification data 120. For the received data, the classification device 104 can determine the classification class is the class that corresponds to the neuron with the highest value.

EXAMPLES

Figure 7:
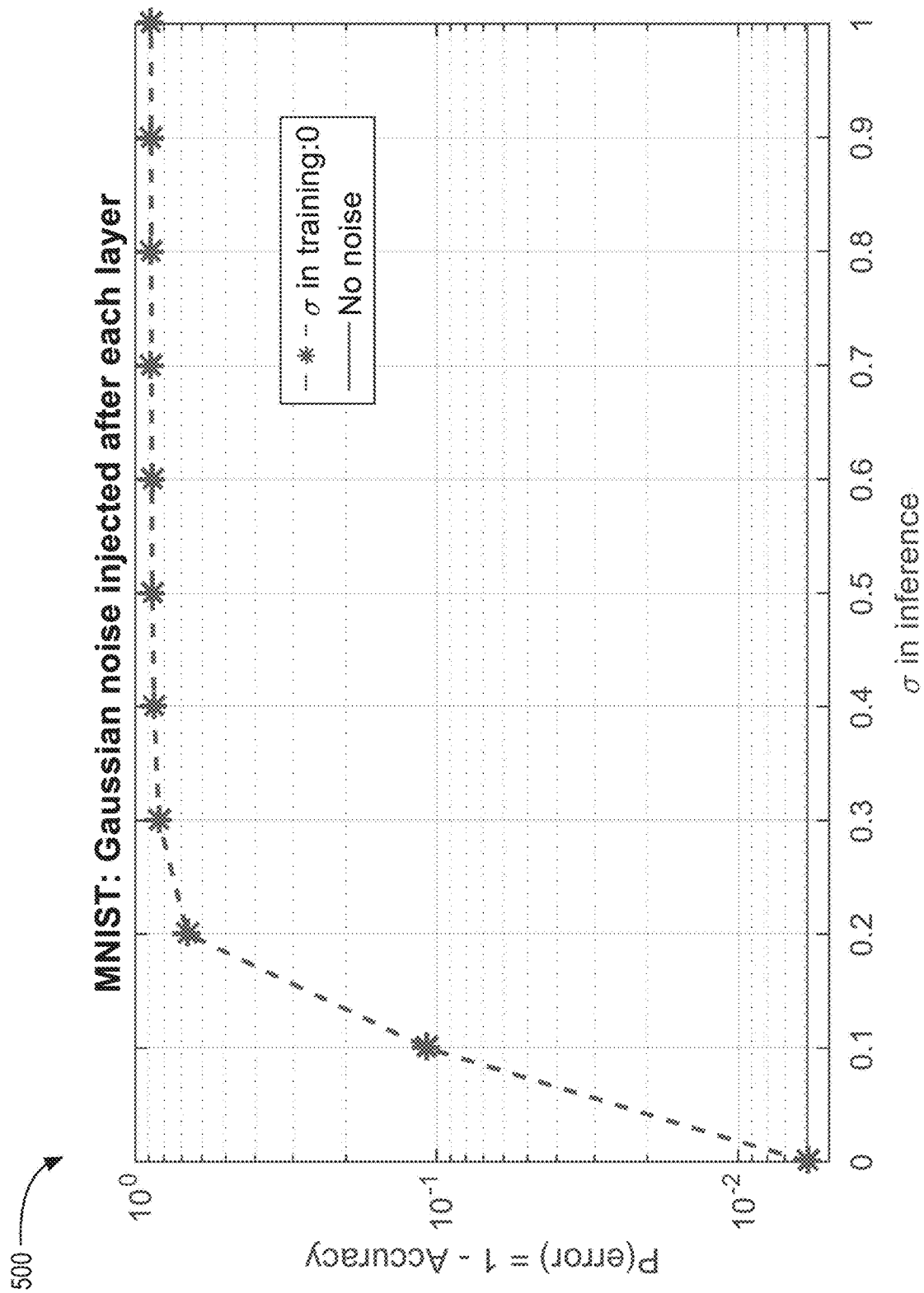
FIG. 7 illustrates a plot of a system's classification error with respect to noise introduced into the signal, in accordance with some embodiments of the present disclosure.

FIG. 7 illustrates a plot 500 of a system's classification error with respect to noise introduced into the signal. The plot 500 illustrates the amount of interference (e.g., noise) along the X axis and the error along the Y axis. The classification system used to generate the data illustrated in the plot 500 was not trained using a neural network as illustrated in FIG. 2 or 3 that includes noise-injection layers. Once trained, the plot 500 illustrates that the neural network could accurately classify input images when the interference was low. However, as input images were input into the neural network that included interference, the error rate of the predictions quickly rose.

Figure 8:
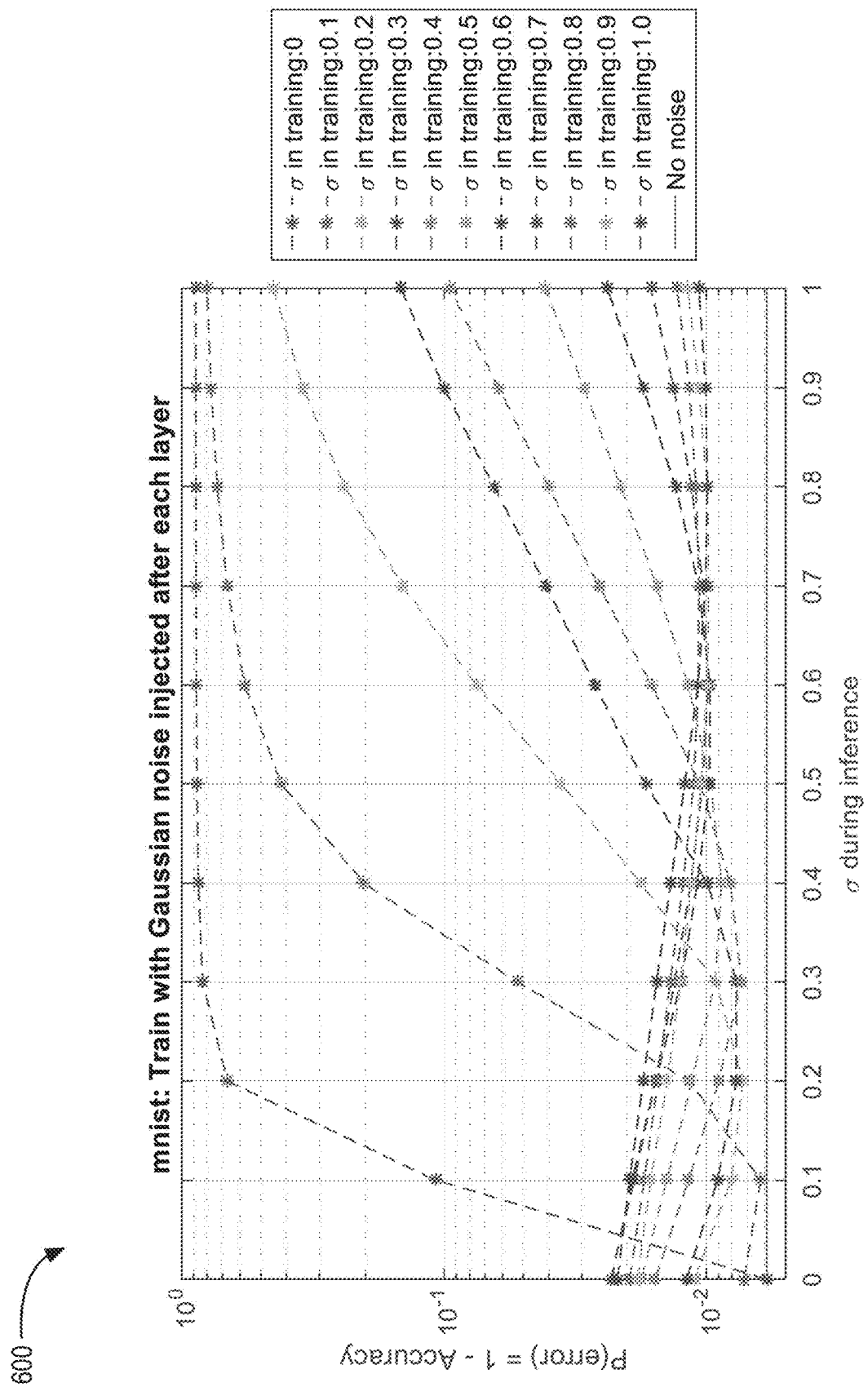
FIG. 8 illustrates a plot of the error rate of neural networks trained with different levels of noise injected during the training phase, in accordance with some embodiments of the present disclosure.

FIG. 8 illustrates a plot 600 of the error rate of neural networks trained with different levels of noise injected during the training phase. The classification systems used to generate the data illustrated in the plot 600 were training using neural networks similar to those illustrated in FIGS. 2 and 3 that include noise-injection layers between the hidden layers. To generate the plot 600, eleven different classification systems were trained. The noise-injection layers of each of the different classification systems injected a different level of noise. Once trained, the noise-injection layers were removed and the classification systems were used to classify images with different levels of interference. As illustrated in the plot 600, the classification systems with neural network that were trained with little or no noise performed poorly on input images that included interference. However, the neural networks that were trained on noisy signals could accurately classify input image that included interference.

Figure 9:
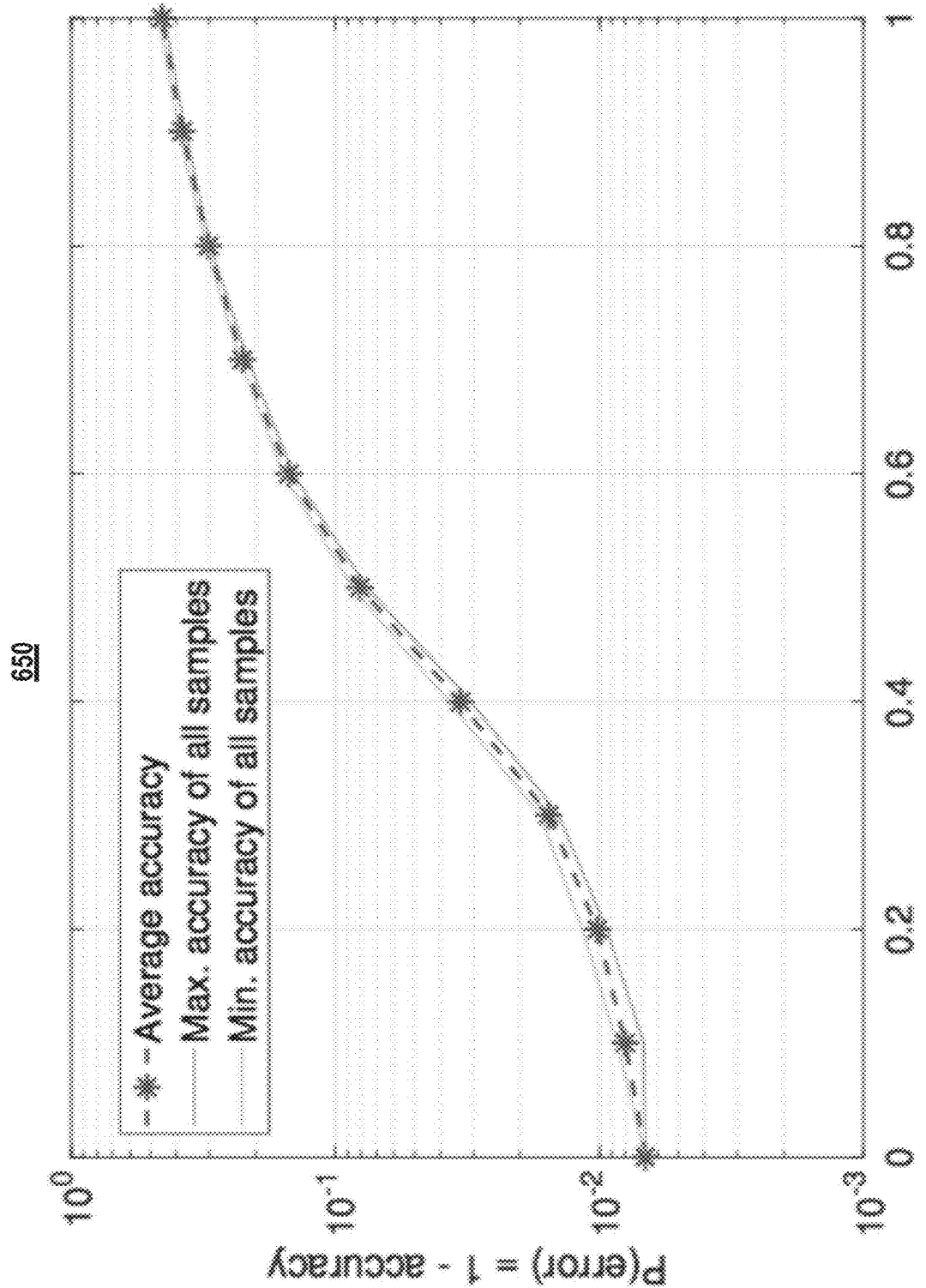
FIG. 9 illustrates a plot of the decrease of average validation accuracy when the noise power is increased from 0.0 (noise-free) to 1.0 ($\sigma=1.0$), in accordance with some embodiments of the present disclosure.

FIG. 9 illustrates a plot 650 of error values of a neural network when the neural network is exposed to different levels of noise. The neural network did not include noise-injection layers, and, accordingly, was not trained with the injection of noise in the forward or backwards pass. FIG. 9 shows the decrease of average validation accuracy (which is 1-P(error)) from 99.33% to 54.80% when the noise power is increased from 0.0 (noise-free) to 1.0 ($\sigma$=1.0). Each point in the figure is the average prediction accuracy of 40 independent tests on the validation set for a certain Gaussian noise power.

Figure 10:
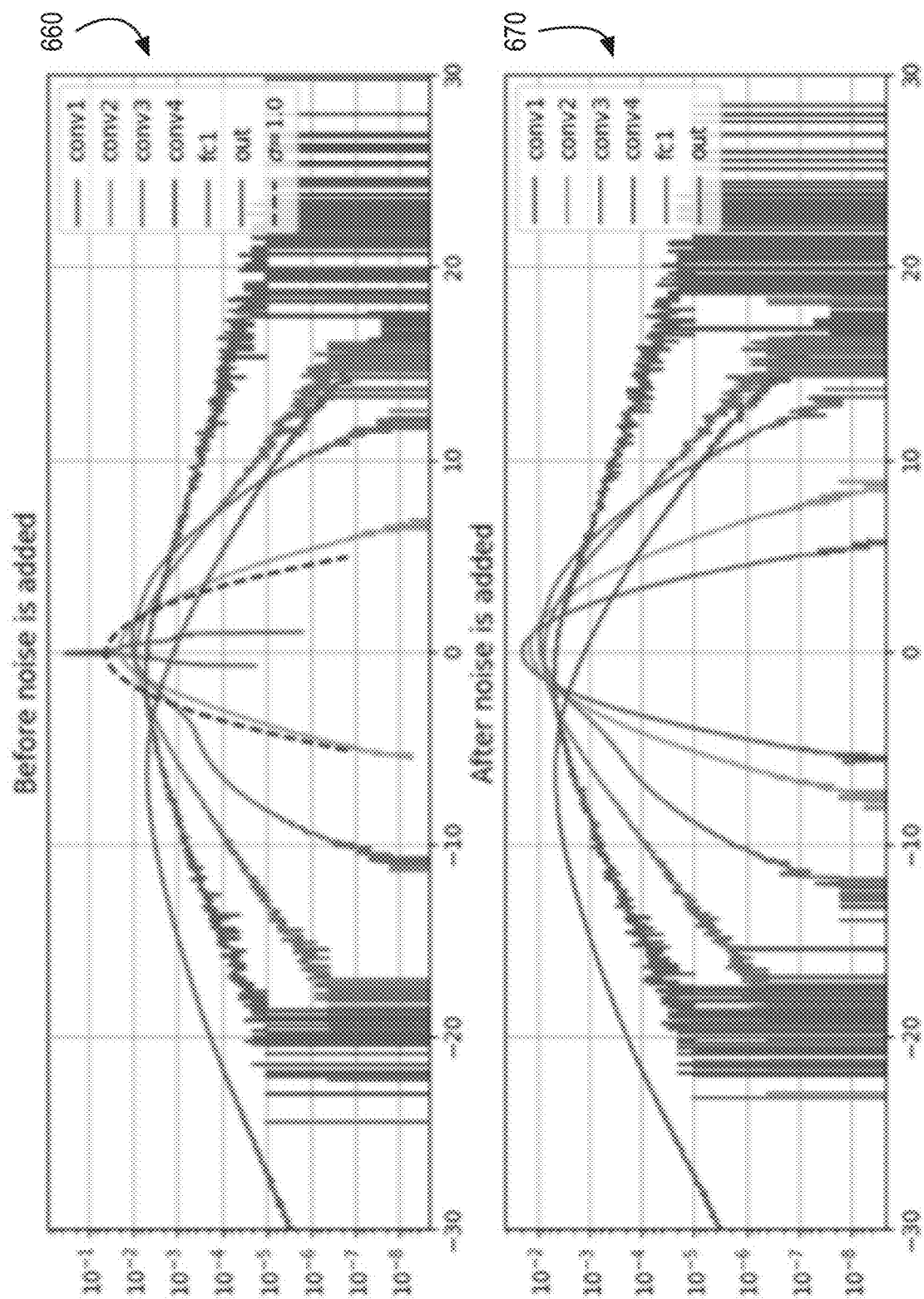
FIG. 10 illustrates a first plot of distributions of the signals in the validation tests for each layer of a neural network before noise is added and after noise is added, in accordance with some embodiments of the present disclosure.

FIG. 10 illustrates a first plot 660 of the distributions of the signals in all 10000 validations for each layer of a neural network before noise is added and a second plot 670 of the distributions of the signals in all 10000 validations for each layer of the neural network after noise is added ($\sigma$=1.0). The dashed curve in the plot 660 illustrates the distribution of the Gaussian noise z~N(0, 1). For example, the 2nd convolutional layers have an output shape (24, 24, 32). The curve "conv2" shows the histogram of 24×24×32×10000=1.8432× $10^8$ values. The plots 660 and 670 illustrate that the noise is wider than the signals of the first layer and comparable to the signals of the second layer. Usually, later convolutional layers have larger and wider signal distributions, but if the first few layers are disrupted by the noisy computations, the later layers may not be able to complete the learning tasks.

In one example, a CNN was generated that included a noise-injection layer, as described herein, after each matrix-vector multiplication. The tests with the CNN were repeated with different levels of noise injected via the noise-injection layers. The injected noise had standard deviation $\sigma_{train}$, giving 11 different tests with models with $\sigma_{train}$=0.0 to 1.0 with a step size of 0.1.

Figure 11A:
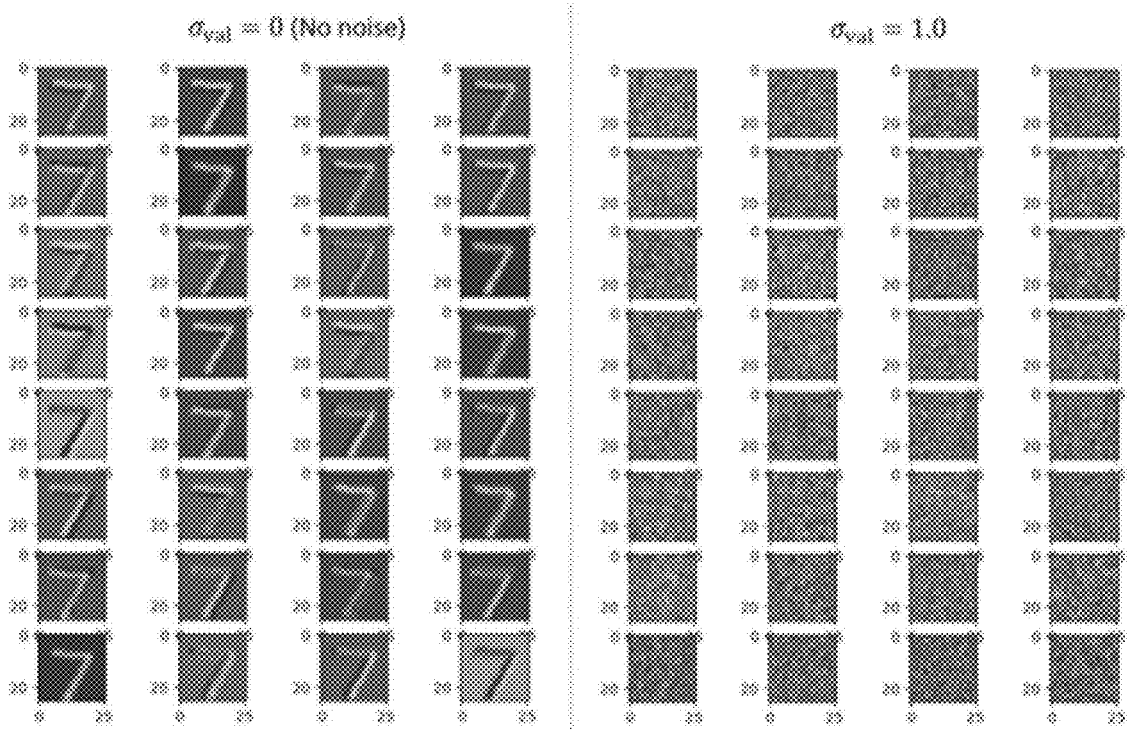
FIGS. 11A-11D illustrate plots of feature maps for a handwritten "7" without noise and with noise ($\sigma=1.0$), in accordance with some embodiments of the present disclosure.
Figure 11B:
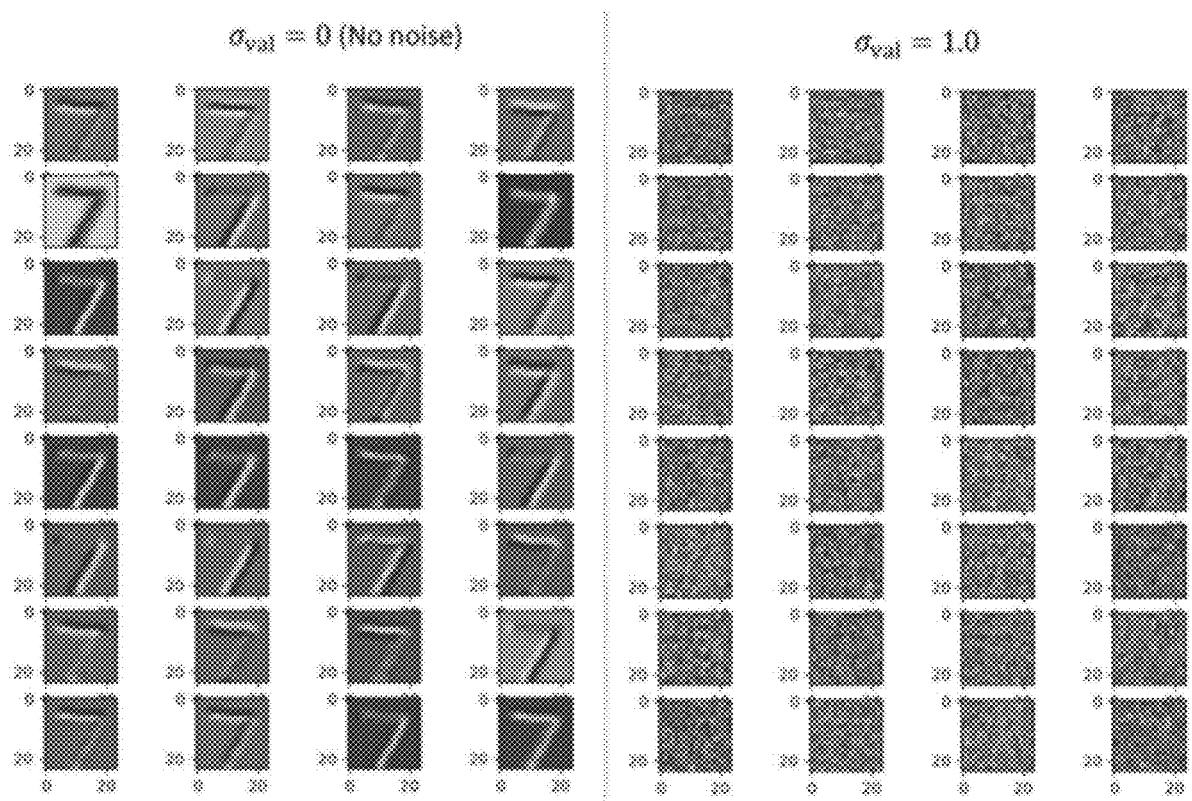
Figure 11C:
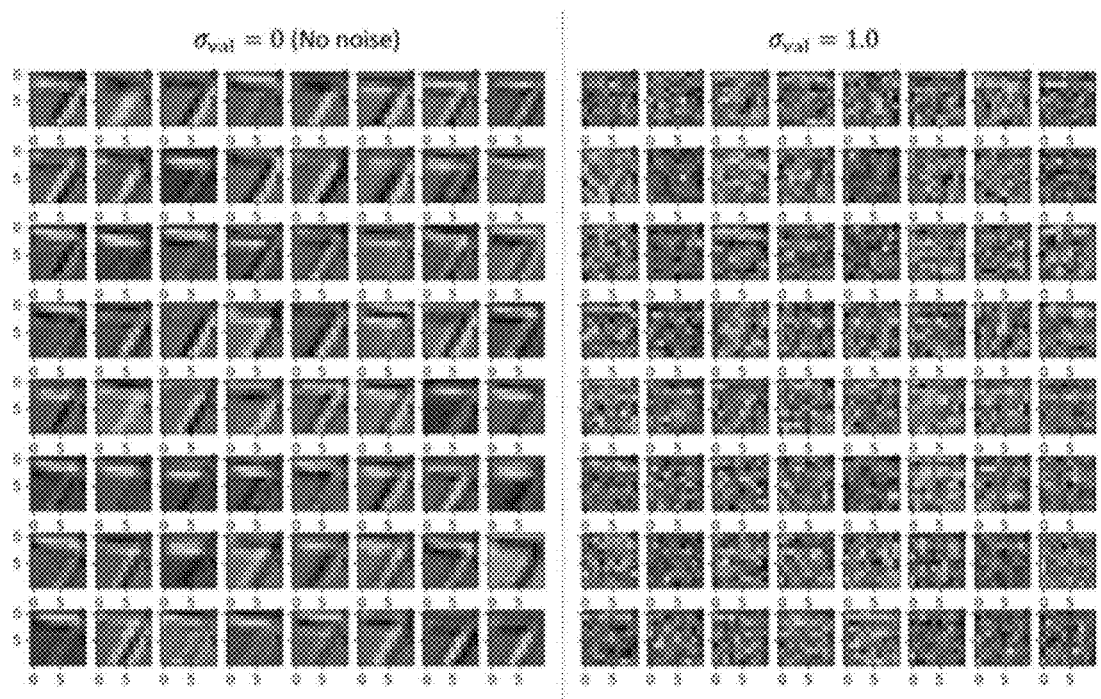
Figure 11D:
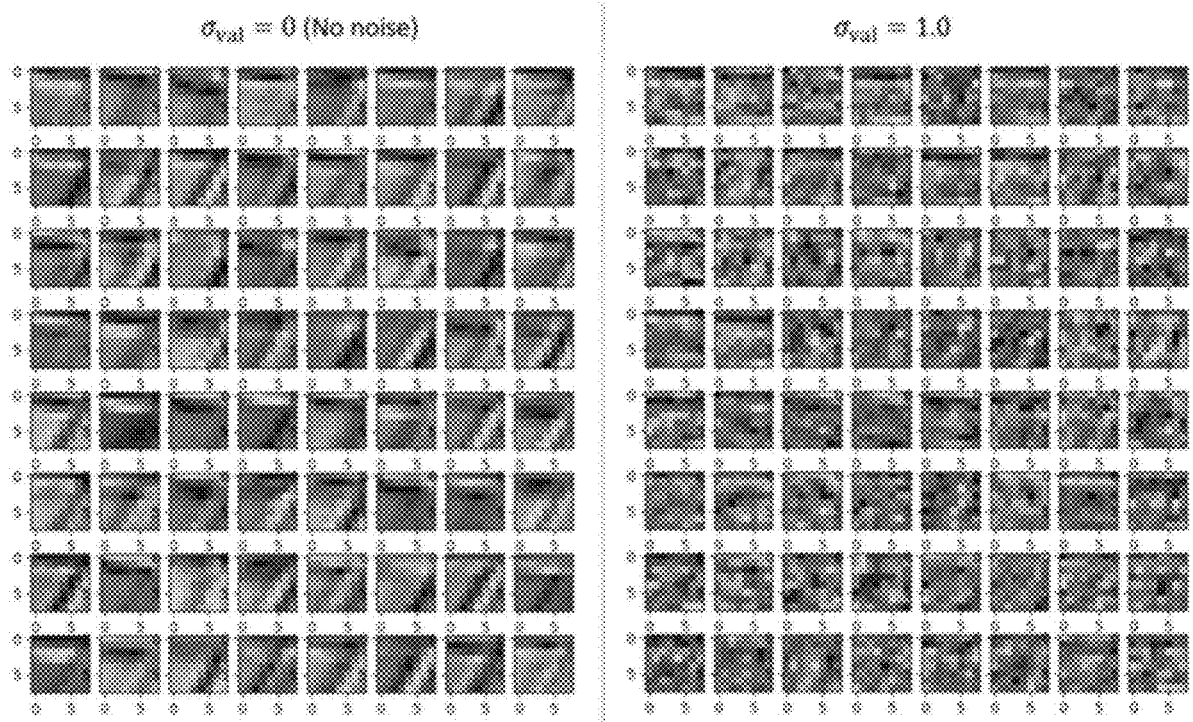
Figure 12:
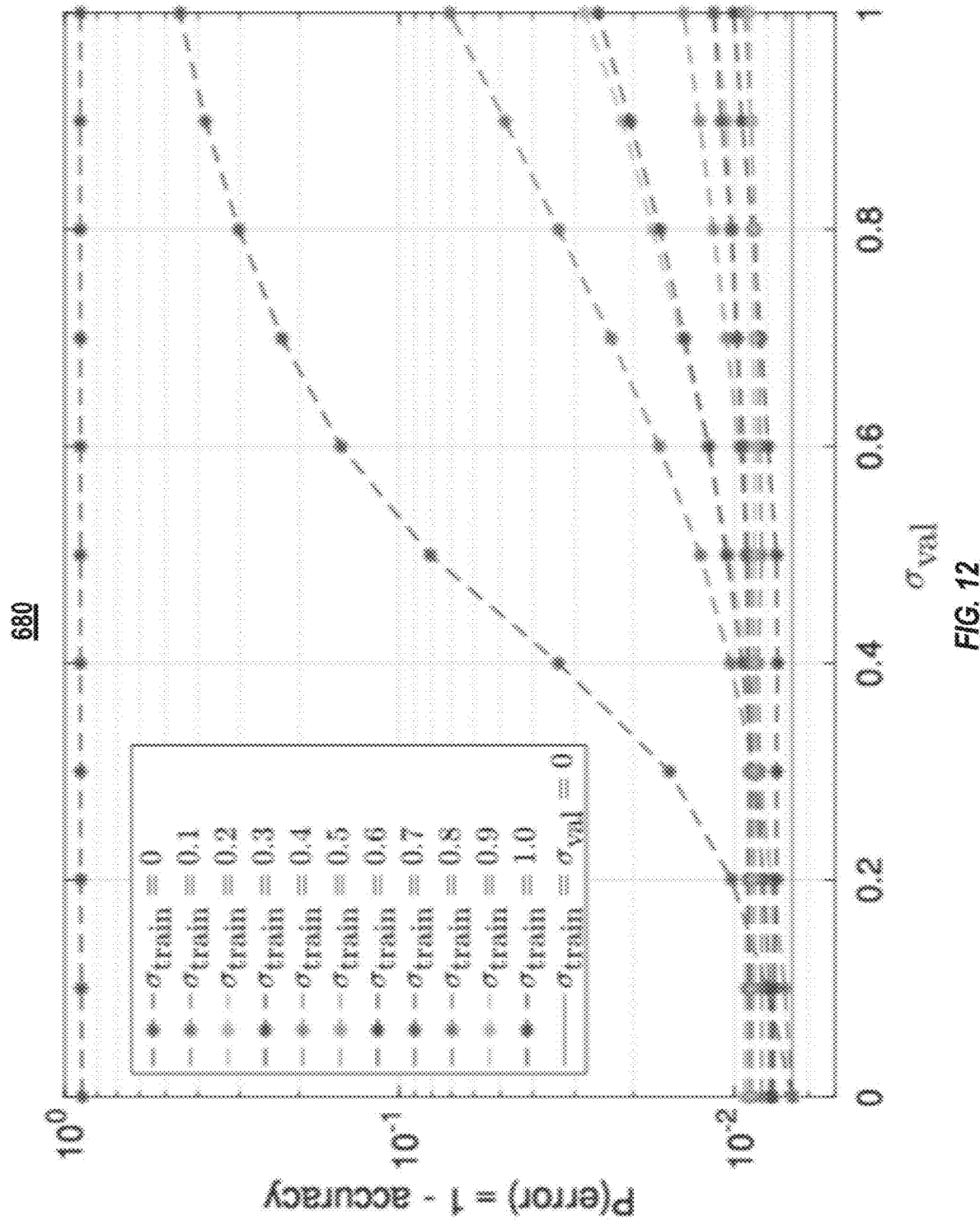
FIG. 12 illustrates a plot of the average validation accuracy of trained convolution neural networks that included noise-injection layers, in accordance with some embodiments of the present disclosure.
Figure 13A:
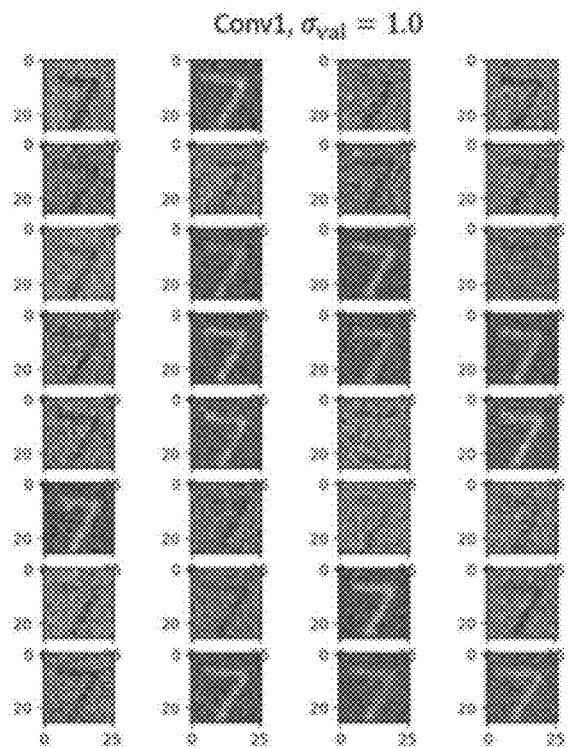
FIGS. 13A-13D illustrate the feature maps after different layers of a convolution neural network trained with noise-injection layers at $\sigma_{train}=0.9$ when tested with a $\sigma_{val}=1.0$, in accordance with some embodiments of the present disclosure.
Figure 13B:
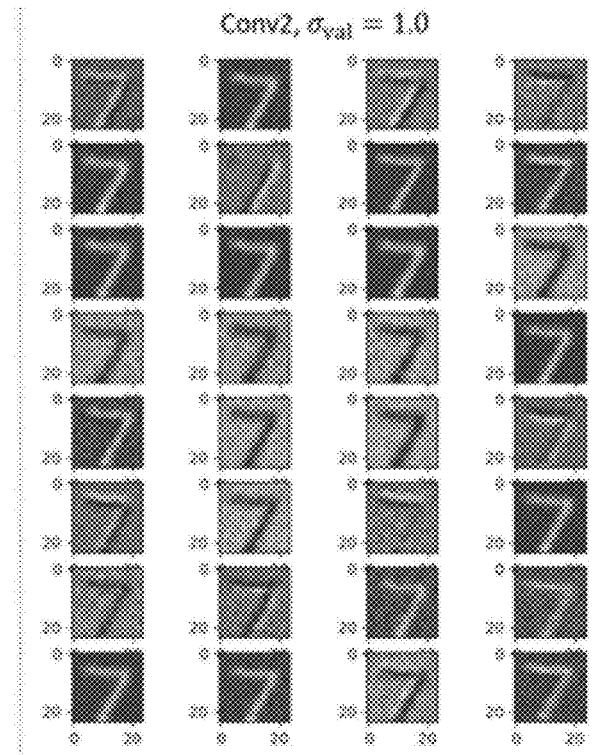
Figure 13C:
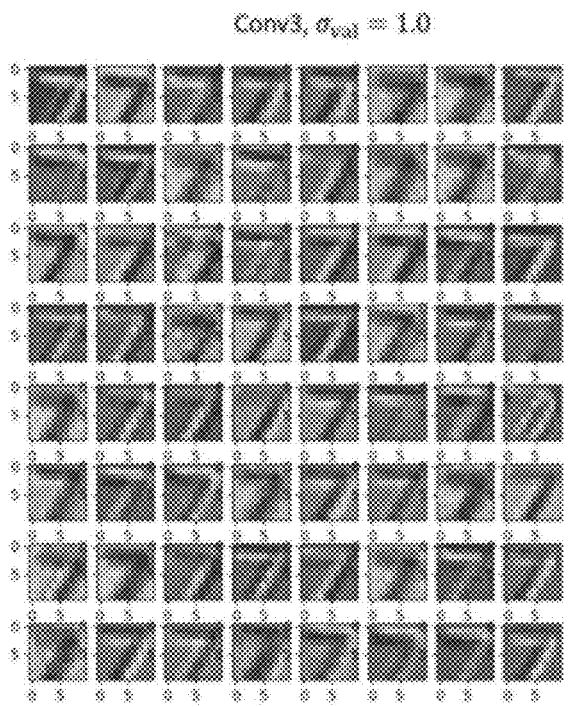
Figure 13D:
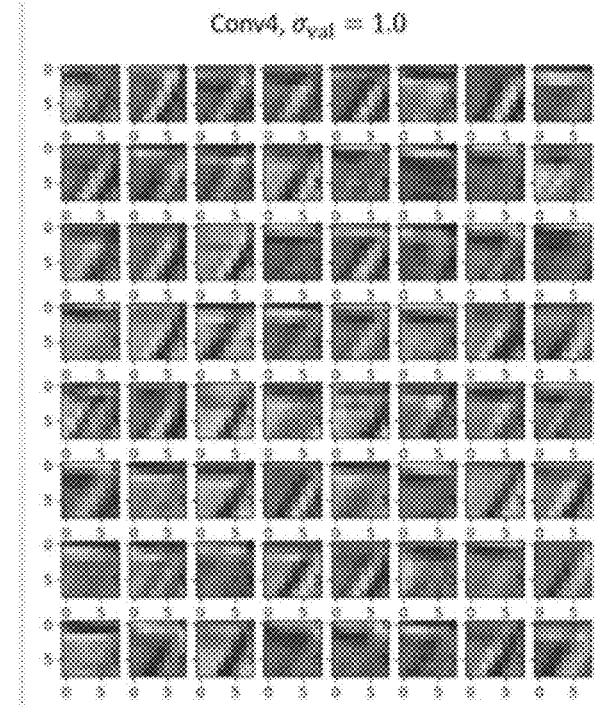

FIGS. 11A-11D illustrate plots of feature maps for a handwritten "7" without noise and with noise ($\sigma$=1.0). As illustrated in the plots the "7" is visually apparent in the feature maps without noise but indistinguishable in the feature maps with noise. FIG. 11A illustrates the feature maps without and with noise after the first layer. FIG. 11B illustrates the feature maps without and with noise after the second layer. FIG. 11C illustrates the feature maps without and with noise after the third layer. FIG. 11D illustrates the feature maps without and with noise after the fourth layer. FIG. 12 illustrates a plot 680 of the average validation accuracy (equivalently, 1-P(error)) of 11 trained CNNs that included noise-injection layers. Each of the curves corresponds to one of the 11 training noise levels ($\sigma_{train}$=0.0 to 1.0 with a step size of 0.1). For comparison, the curve for "$\sigma$ train=0" is equivalent to a CNN without noise-injection layers. The plot 680 was generated by generating 11 different sets of network parameters (e.g., weights)—one for each of the $\sigma_{train}$ step sizes. The CNN, with each of the different sets of network parameters, was tested against different levels of validation noise ($\sigma_{val}$), which represents the noise that can be present in an analog processor. At each level of validation noise (and for each set of network parameters) tests were conducted to classify handwritten digits giving 11×11 combinations of ($\sigma_{train}$, $\sigma_{val}$). The average validation accuracy is then plotted as one point in the plot 680. The plot 680 illustrates that the CNNs trained with noise-injection layers are more robust to noisy computations and give lower P(error) values when compared to the CNN trained without noise-injection layers. The validation accuracies were all greater than 99% when the injected noise during training has a $\sigma_{train}$=0.9.

FIGS. 13A-13D illustrate the feature maps after different layers of a CNN trained with noise-injection layers at $\sigma_{train}$=0.9 when tested with a $\sigma_{val}$=1.0. When compared to the feature maps of the CNN trained without noise-injection layers (FIGS. 11A-11D), the feature maps at each of the different layers still visually represent a "7."

In another example, an RNN with a LSTM architecture was generated to include noise-injection layers. The RNN with the noise-injection layers was used to generate different sets of network parameters. The RNN was provided handwritten digits for classification. The number of LSTM cells (also referred to as steps) equals the number of rows in the provided image and the input dimension of one LSTM cell equals the number of columns in the image. Table 1 summarizes the LSTM architecture of the example. The input to each LSTM cell is a row in the image. The Gaussian noise is added to five matrix-vector multiplications. Four of them are in the LSTM cell (e.g., the four noise-injection layers 204 within the forget-gate layer 356 illustrated in FIG. 5) and the other noise-injection layer is the fully connected layer between the 128-dimensional LSTM output state and the 10 neurons for classification (e.g., the noise-injection layer 204 outside the forget-gate layer 356). In some implementations, the internal states (upper horizontal signal flow in FIG. 5) are element-wise multiplications performed by the digital processors and not affected by the noise.

| | |
|---|---|
| Number of LSTM Cells | 28 |
| Input Shape | (28, 1) |
| LSTM internal state size | 128 |
| LSTM output state size | 128 |
| Number of trainable parameters | 81674 |

Figure 14:
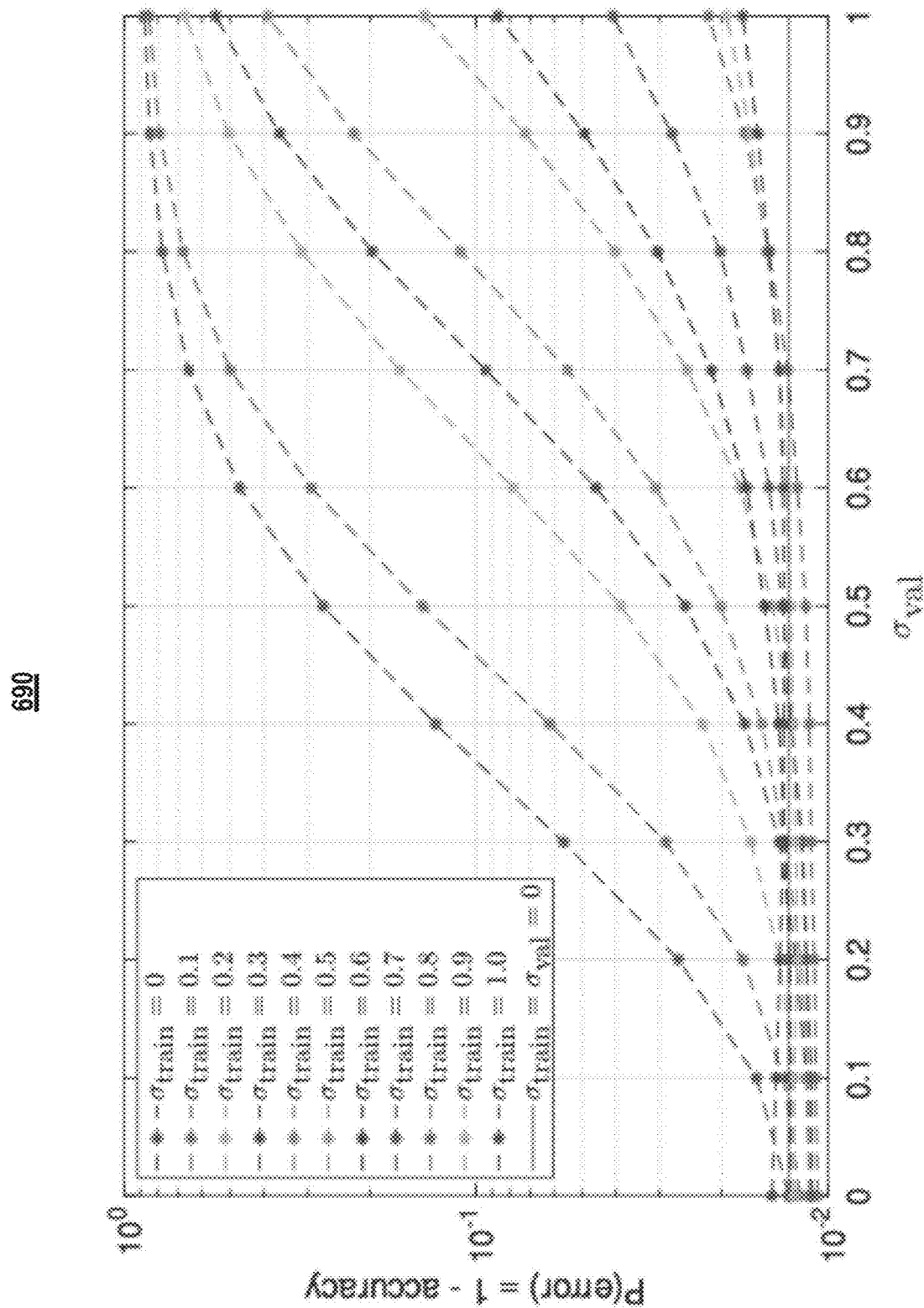
FIG. 14 illustrates a plot of the prediction accuracy of long-short-term-memory neural networks trained with noise-injection layers, in accordance with some embodiments of the present disclosure.
Figure 15:
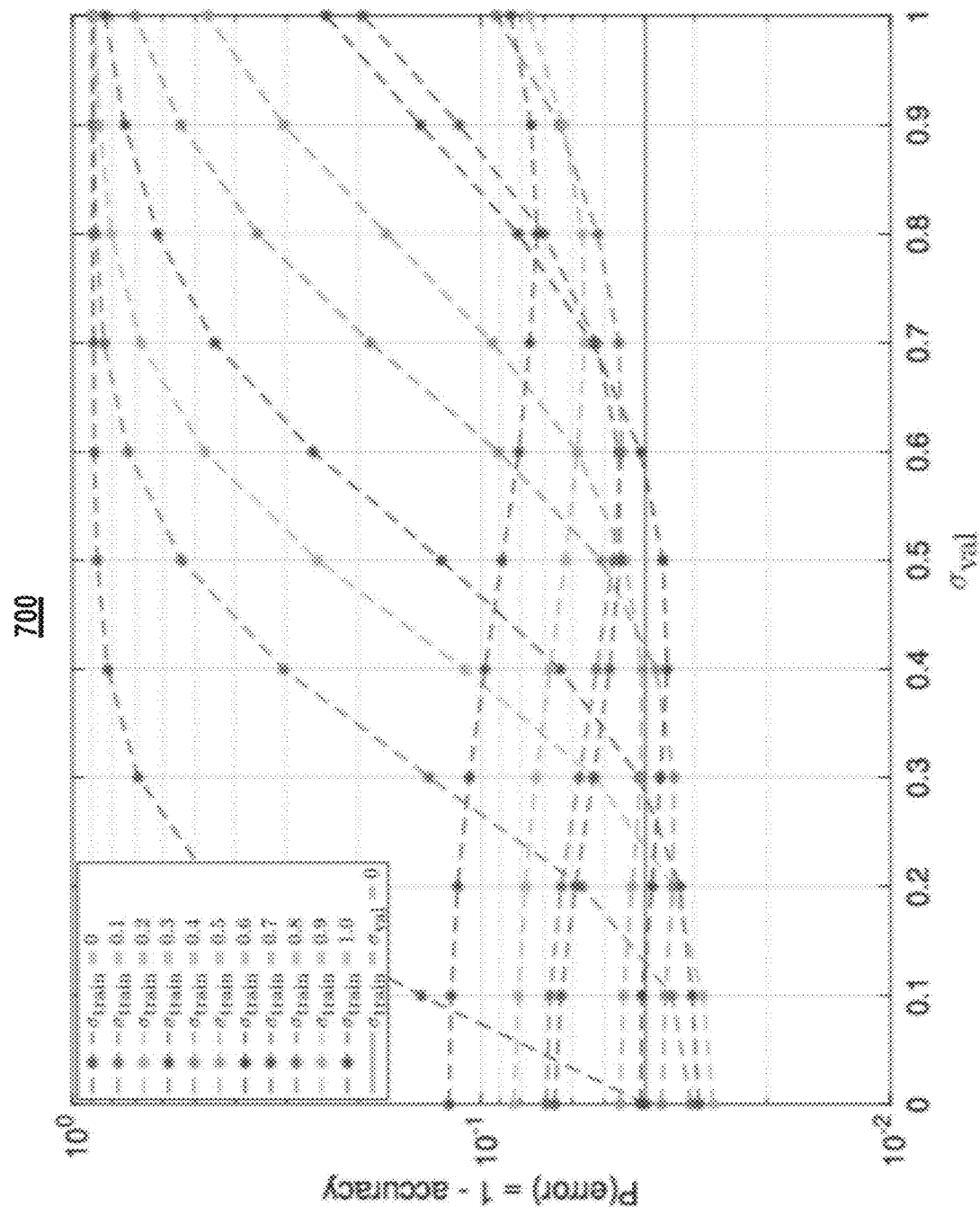
FIG. 15 illustrates a plot of the prediction accuracy of recurrent neural networks trained with noise-injection layers, in accordance with some embodiments of the present disclosure.

FIG. 14 illustrates a plot 690 of the prediction accuracy of ($\sigma_{train}$, $\sigma_{val}$) pairs with $\sigma_{train}$=0.0 to 1.0 and $\sigma_{val}$=0.0 to 1.0, both with a step size of 0.1. Each point is obtained as the average of 40 independent tests. The top curve corresponds to a LSTM using network parameters trained with a conventional LSTM without noise-injection layers. As illustrated in FIG. 15, the noise parameters trained without noise-injection layers is the least robustness against noisy computations. For example, the validation accuracy drops from 98.7% to 12.5% when the noise power increases from 0.0 to 1.0. In contrast, the plot 690 illustrates that network parameters generated from LSTMs with larger $\sigma_{train}$'s provide better robustness. In particular, when $\sigma_{train}$=1.0, all validation accuracies were greater than 98%. As illustrated in FIG. 15, the LSTM architecture with noise-injection layers provides for better accuracy than conventional training and validation when $\sigma_{train}$=$\sigma_{val}$=0.

FIG. 15 illustrates a plot 700 of the prediction accuracy of ($\sigma_{train}$, $\sigma_{val}$) pairs with $\sigma_{train}$=0.0 to 1.0 and $\sigma_{val}$=0.0 to 1.0, both with a step size of 0.1, for an RNN, such as that illustrated in FIG. 4. The plot 700 was generated under similar conditions to that of plot 690. As illustrated in FIG. 16, the validation accuracy drops from 98% to 15% when the noise power increases from 0.0 to 1.0 for a RNN trained without noise-injection layers, while, an RNN trained with noise-injection layers ($\sigma_{train}$=0.9) maintains a validation accuracy above 94% across all noise levels.

The subject matter described herein sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A system comprising:
   a memory comprising a plurality of memory cells, each of the memory cells configured to store one of a plurality of weights of a hidden layer of a neural network as a corresponding conductance value; and
   one or more processing circuits, including a noise generator, coupled with the memory and configured to:
   receive a plurality of input voltages for the hidden layer of the neural network, each of the input voltages corresponding to an output voltage of a preceding layer of the neural network;
   generate, by the noise generator, one or more noise components;
   add a corresponding one of the one or more noise components to each of the input voltages for the hidden layer of the neural network;
   perform a matrix multiplication of the input voltages for the hidden layer of the neural network including the added corresponding noise component with the weights of the hidden layer of the neural network by applying each of the input voltages including the added corresponding noise component to a corresponding input of the memory;
   determine a plurality of output voltages from the memory corresponding to the matrix multiplication of the input voltages for the hidden layer of the neural network including the added corresponding noise component with the weights of the hidden layer of the neural network; and
   determine a classification based on the output voltages.

2. The system of claim 1, wherein the plurality of memory cells comprises at least one of resistive random-access memory (ReRAM), memristors, or phase change memory (PCM).

3. The system of claim 1, wherein the one or more processing circuits are further configured to:
   receive the plurality of weights of the hidden layer of the neural network; and
   each of the plurality of weights into a respective one of the plurality of memory cells as the corresponding conductance value.

4. The system of claim 1, wherein the neural network is a recurrent neural network.

5. The system of claim 1, wherein the neural network is a convolutional neural network.

6. The system of claim 1, wherein the neural network is a long-short-memory neural network.

7. A system, comprising:
   one or more processing circuits, including a noise generator, configured to couple to a plurality of memory cells of a resistive network, the one or more processing circuits further configured to:
   receive a plurality of weights for a hidden layer of a neural network;
   set each of the plurality of weights into a memory cell of the plurality of memory cells of the resistive network as a corresponding conductance value;

receive a plurality of input voltages for the hidden layer of the neural network, each of the input voltages corresponding to an output voltage of a preceding layer of the neural network;

generate, by the noise generator, one or more noise components;

add a corresponding one of the one or more noise components to each of the plurality of input voltages for the hidden layer of the neural network;

apply each of the plurality of input voltages including the added noise component for the hidden layer of the neural network to a corresponding input of the resistive network to thereby perform a matrix multiplication with the weights of the hidden layer of the neural network;

determine a plurality of output voltages corresponding to the matrix multiplication from the resistive network; and determine a classification based on the plurality of output voltages.

8. The system of claim 7, further comprising the resistive network, the resistive network comprising the plurality of memory cells.

9. The system of claim 8, wherein each of the plurality of memory cells comprises at least one of resistive random-access memory (ReRAM), memristors, or phase change memory (PCM).

10. A method, comprising:

receiving a plurality of input voltages for a hidden layer of a neural network, each of the input voltages corresponding to an output voltage of a preceding layer of the neural network;

generating one or more noise components by a noise generator;

adding a corresponding one of the one or more noise components to each of the input voltages for the hidden layer of the neural network;

applying the input voltages including the added corresponding noise components to corresponding inputs of a memory comprising a plurality of memory cells, each of the memory cells configured to store one of a plurality of weights of a hidden layer of a neural network as a corresponding conductance value, to thereby perform a matrix multiplication of the weights of the hidden layer of the neural network with the input voltages including the added corresponding noise components;

determining a plurality of output voltages from the memory corresponding to the matrix multiplication of the weights of the hidden layer of the neural network with the input voltages including the added corresponding noise components; and determining a classification based on the output voltages.

11. The method of claim 10, wherein the plurality of memory cells are part of a resistive network, the method further comprising:

setting of the plurality of weights by loading the plurality of weights into the plurality of memory cells by setting the corresponding conductance value of each of respective plurality of memory cells in the resistive network.

12. The method of claim 10, wherein the plurality of memory cells comprises at least one of resistive random-access memory (ReRAM), memristors, or phase change memory (PCM).

13. A method, comprising:

receiving a plurality of weights for a hidden layer of a neural network;

setting each of the plurality of weights into a memory cell of a resistive network as a corresponding conductance value;

generating one or more noise components by a noise generator;

receiving a plurality of input voltages for the hidden layer of the neural network, each of the input voltages corresponding to an output voltage of a preceding layer of the neural network;

adding a corresponding one of the one or more noise components to each of the plurality of input voltages for the hidden layer of the neural network;

applying each of the plurality input voltages including the added noise component for the hidden layer of the neural network to a corresponding input of the resistive network to thereby perform a matrix multiplication with the weight of the hidden layer of the neural network;

determining a plurality of output voltages corresponding to the matrix multiplication from the resistive network; and determining a classification based on the plurality of output voltages.

14. The method of claim 13, wherein each of the plurality of memory cells comprises at least one of a resistive random-access memory (ReRAM), memristors, or phase change memory (PCM).

15. The method of claim 13, further comprising:

determining the plurality of weights, wherein determining the plurality of weights comprises determining the weight for each of the plurality of weights with backpropagation.

16. The method of claim 13, wherein the noise component is one of Gaussian noise, Brownian noise, Poisson noise, Speckle noise, or Salt and Pepper noise.

17. The method of claim 13, further comprising determining a plurality of biases for the neural network.

18. The method of claim 13, wherein the neural network is a recurrent neural network.

19. The method of claim 13, wherein the neural network is a convolutional neural network.

20. The method of claim 13, wherein the neural network is a long-short-memory neural network.

* * * * *